United States Patent [19]

Sullivan

[11] Patent Number: 5,690,443
[45] Date of Patent: Nov. 25, 1997

[54] ADJUSTABLE, RELEASABLE BINDING FASTENER

[76] Inventor: Thomas V. Sullivan, 121 Marine Ave., Balboa Island, Calif. 92662

[21] Appl. No.: 657,317

[22] Filed: Jun. 3, 1996

Related U.S. Application Data

[63] Continuation-in-part of Ser. No. 461,061, Jun. 5, 1995, abandoned.

[51] Int. Cl.⁶ ..................................................... B42F 3/00
[52] U.S. Cl. .................. 402/63; 402/68; 402/64; 402/60
[58] Field of Search ........................ 402/63, 60, 62, 402/67, 68; 281/28

[56] References Cited

U.S. PATENT DOCUMENTS

| | | |
|---|---|---|
| 1,897,024 | 2/1933 | Shuss ........................... 402/63 |
| 1,962,035 | 6/1934 | Reiten ........................... 402/63 |
| 3,083,714 | 4/1963 | Foster . |
| 3,251,260 | 5/1966 | Serdechny . |
| 3,647,306 | 3/1972 | Chamberlin . |
| 3,866,274 | 2/1975 | Malavazos . |
| 3,874,041 | 4/1975 | Smith . |
| 3,970,331 | 7/1976 | Giulie . |
| 4,075,924 | 2/1978 | McSherry et al. . |
| 4,175,880 | 11/1979 | Muller . |
| 4,180,340 | 12/1979 | Cosby ........................... 402/63 |
| 4,305,675 | 12/1981 | Jacinto . |
| 4,657,462 | 4/1987 | Hoen . |
| 4,730,792 | 3/1988 | Sun et al. . |
| 4,874,186 | 10/1989 | Groswith, III . |
| 4,893,836 | 1/1990 | Groswith, III . |
| 4,991,990 | 2/1991 | Frank et al. ........................... 402/75 |
| 5,074,696 | 12/1991 | Tanaka . |
| 5,080,398 | 1/1992 | Groswith, III . |
| 5,134,757 | 8/1992 | Johnson . |
| 5,320,456 | 6/1994 | With . |

*Primary Examiner*—Willmon Fridie, Jr.
*Attorney, Agent, or Firm*—Curtis L. Harrington

[57] ABSTRACT

A fastening device has male and female portions, the male portion having a base and a downwardly extending post with two vertical series of horizontal ratchet teeth, one on each side of the post, and two convex lobes extending outwardly in diametrically opposing positions between the two vertical series of ratchet teeth. The female portion has a base and an upwardly extending collar consisting of two curved halves. Each collar half has a series of horizontal ratchet teeth on its inner surface. The circular space defined by the collar halves continues through an aperture in the base. The ratchet teeth may also continue on the inside wall of the aperture. To assemble the fastener the collar of the female portion is placed into a binding hole in a stack of paper, and the post of the male portion is placed into the opposite side of the binding hole, with its base mutually aligned with the base of the female portion. The post is pushed manually into the collar, where its teeth lock with the teeth in the collar. To disassemble the fastener, the opposing bases are rotated until the teeth disengage, and the portions can be withdrawn from each other and removed from the stack.

25 Claims, 17 Drawing Sheets

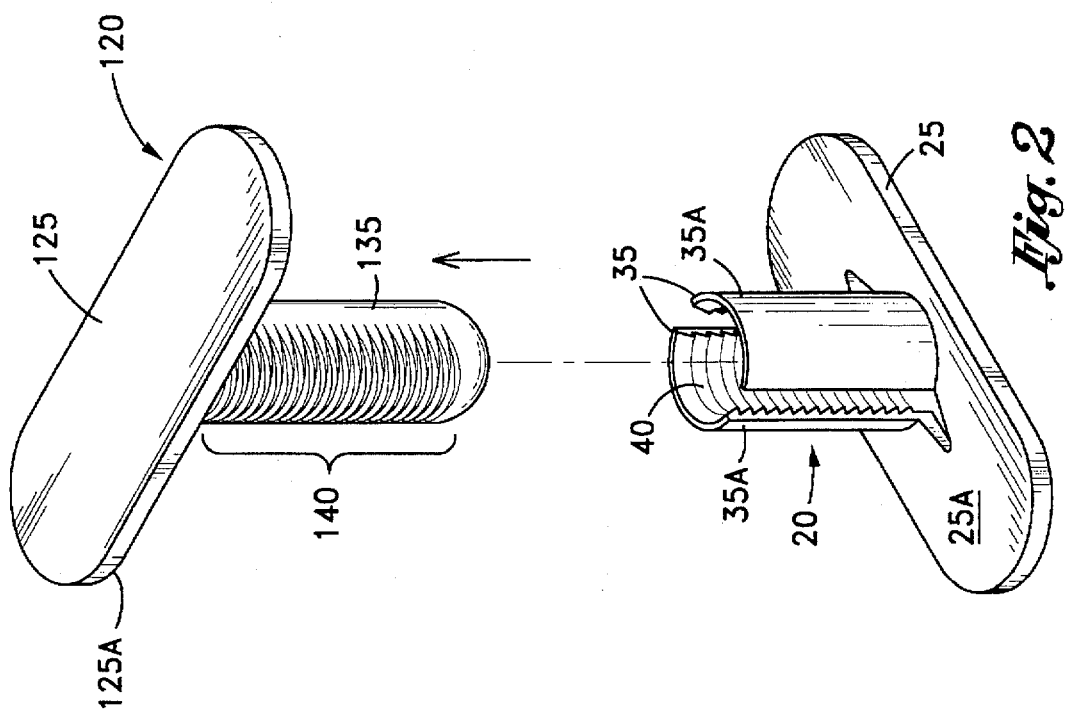
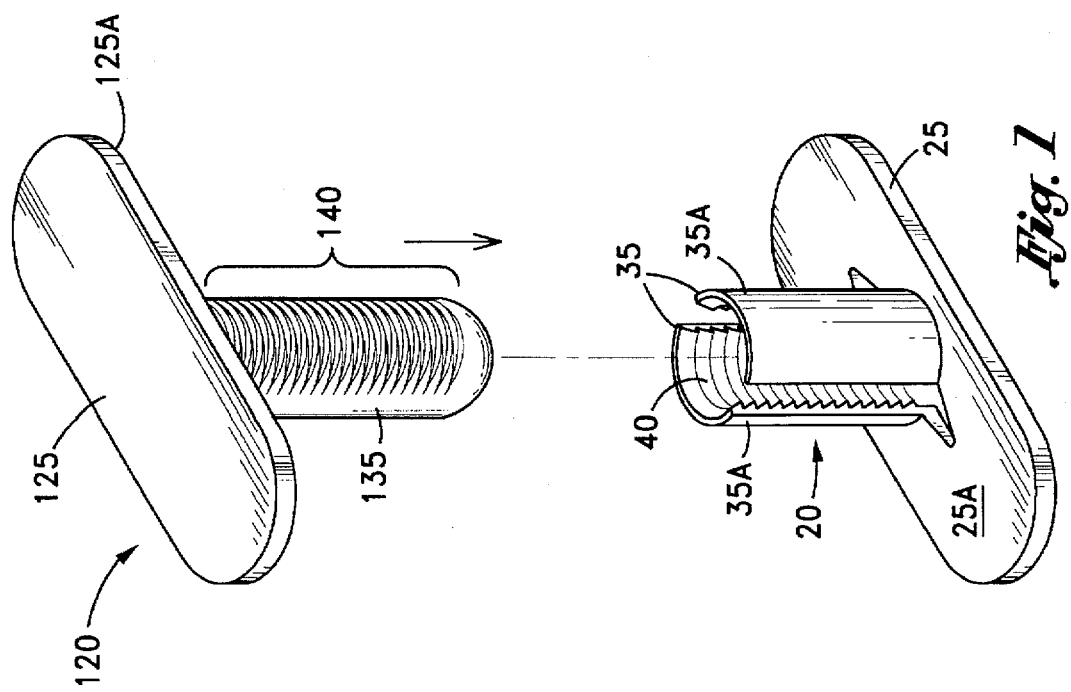

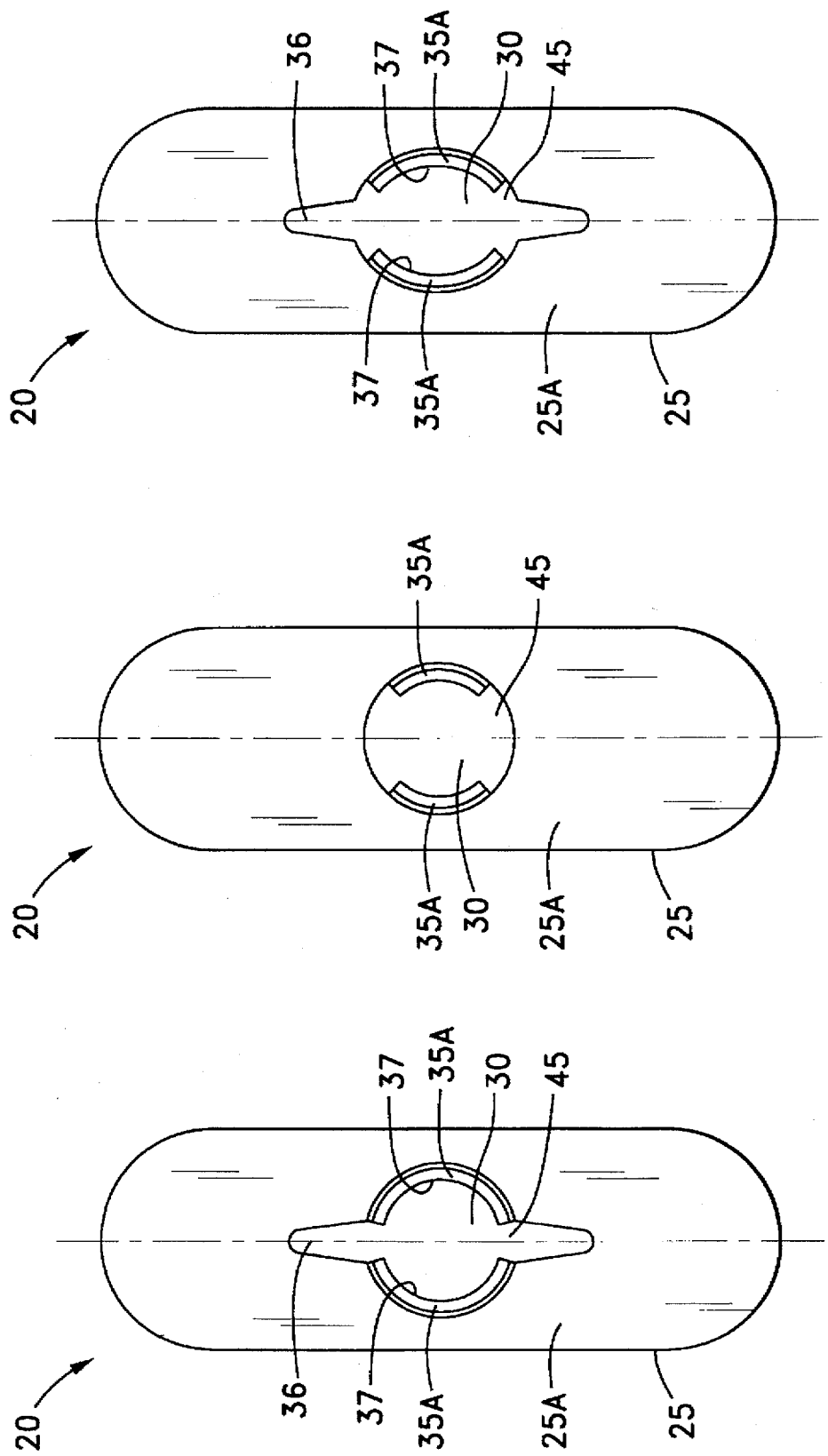

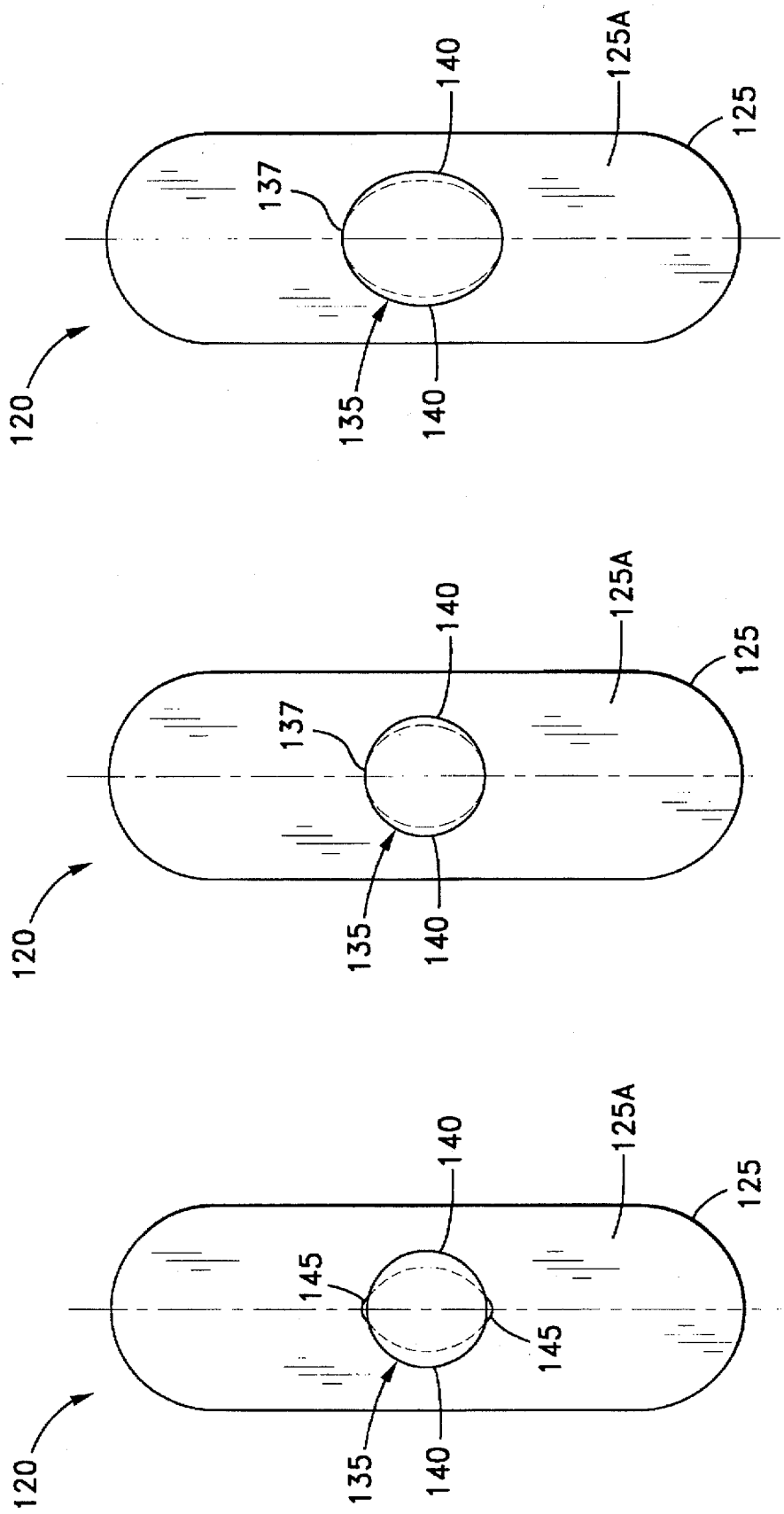

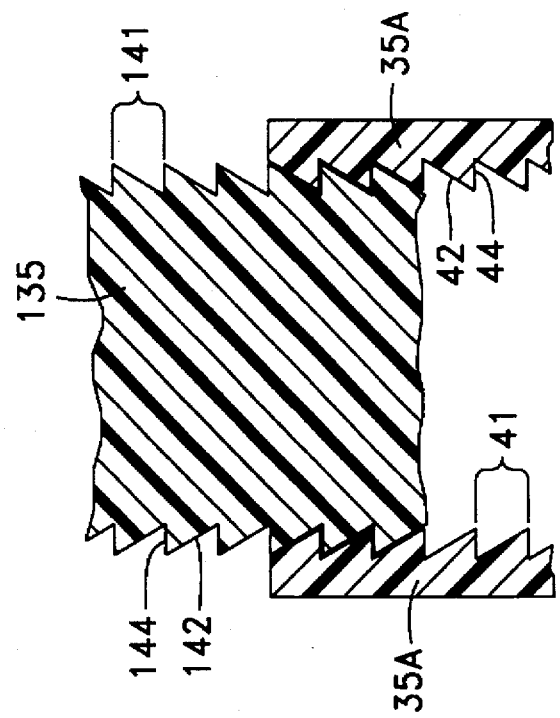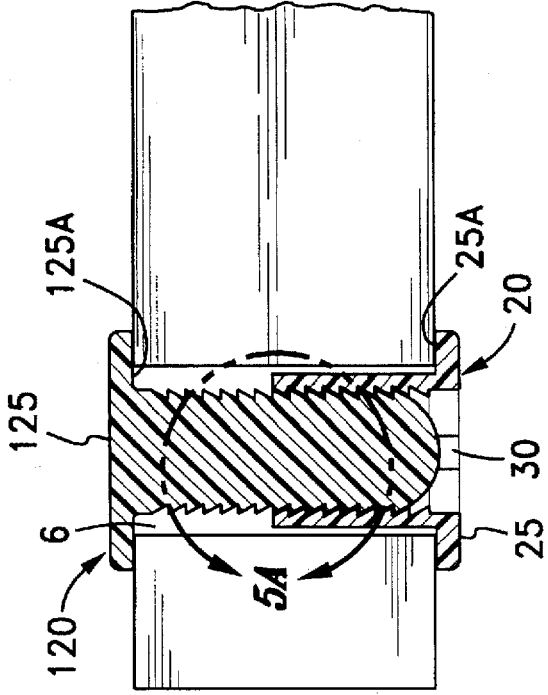

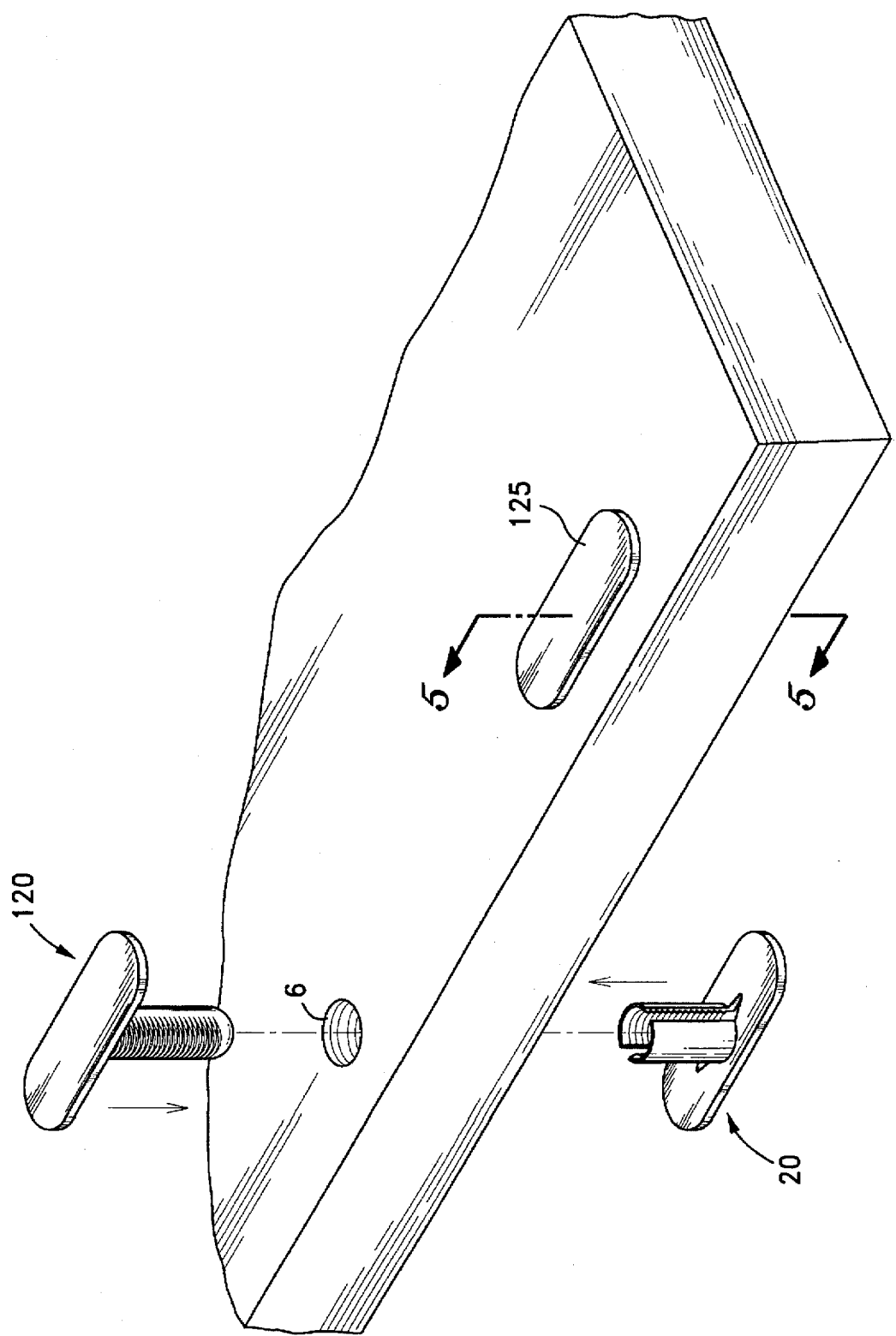

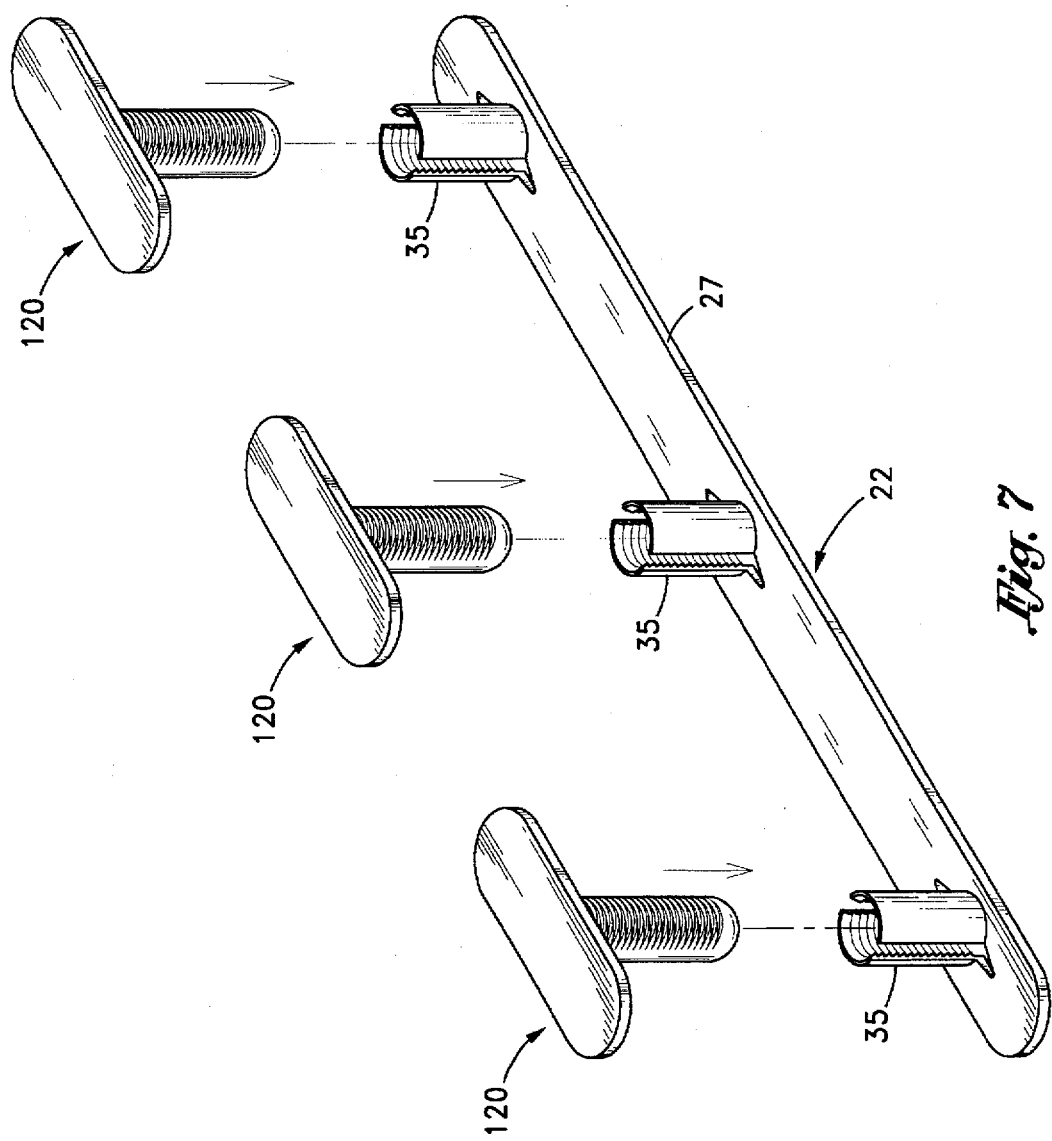

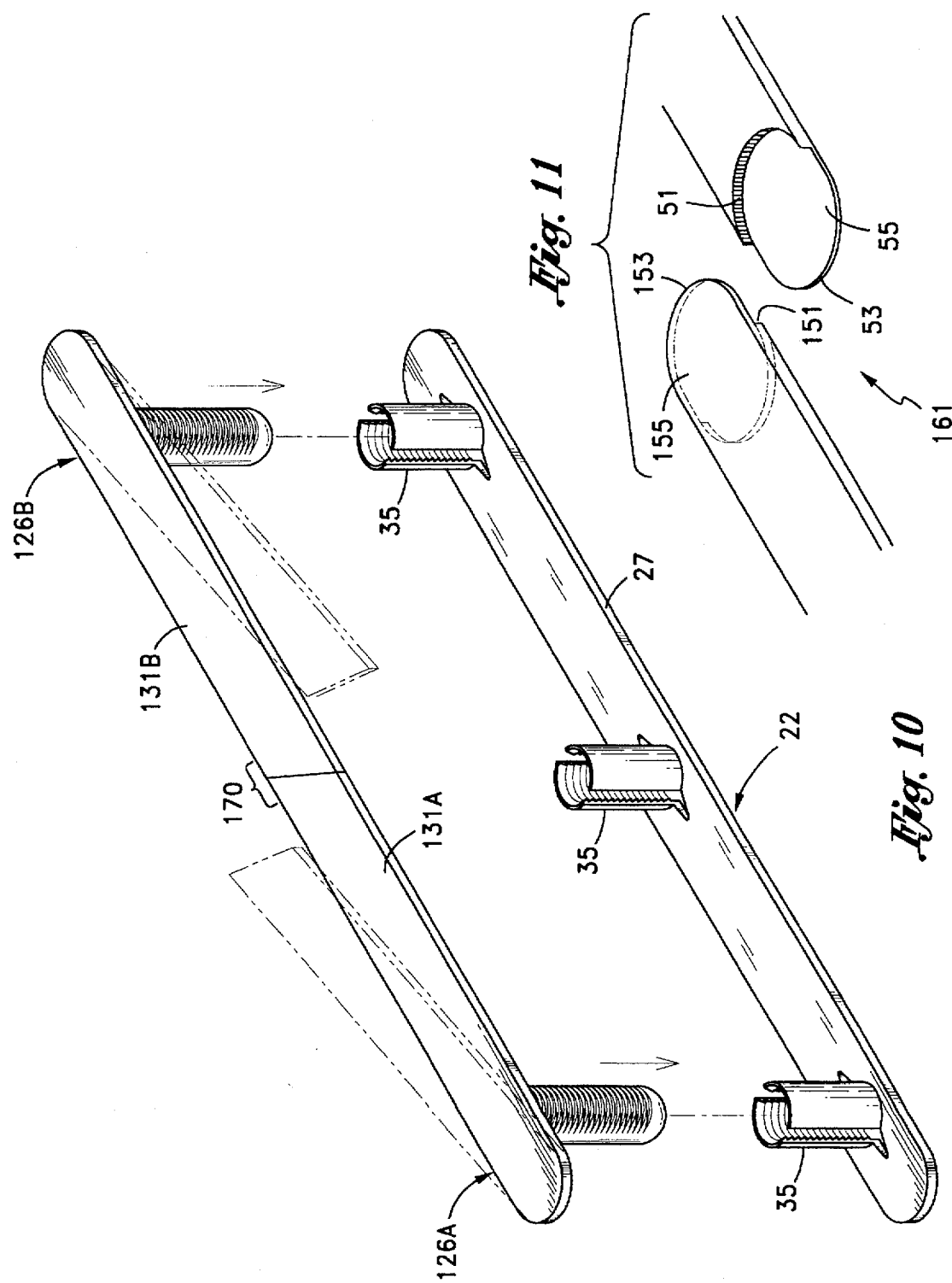

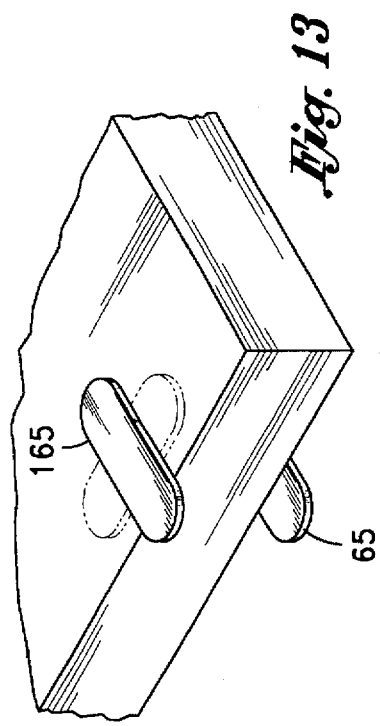
Fig. 13
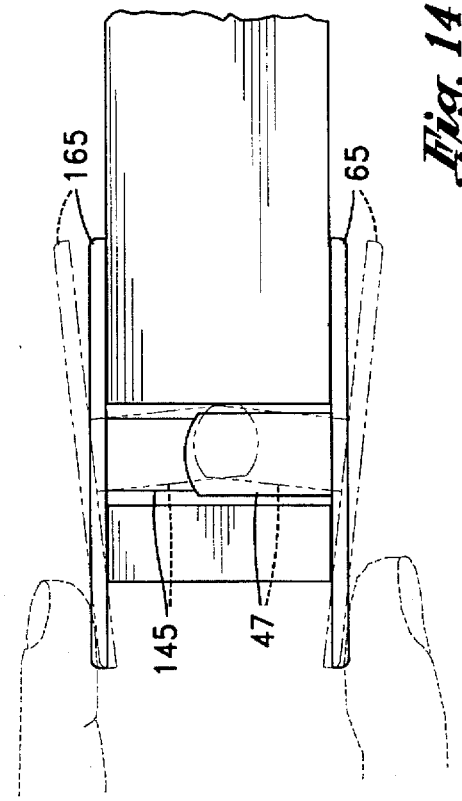
Fig. 14
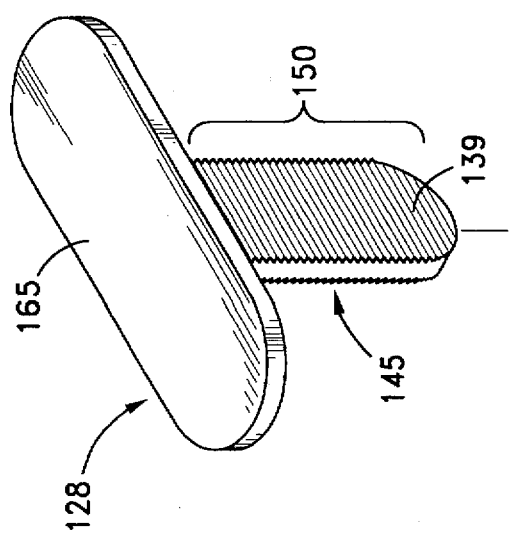
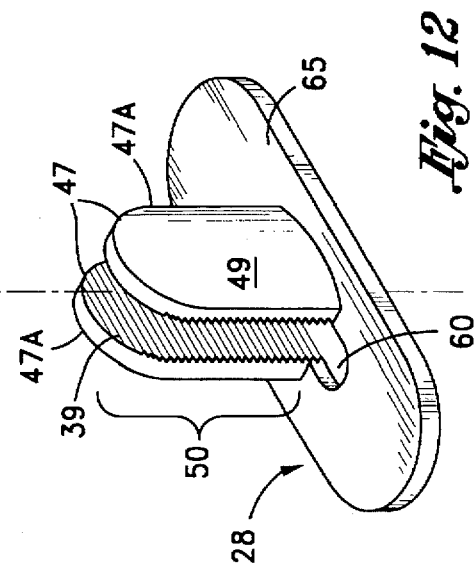
Fig. 12

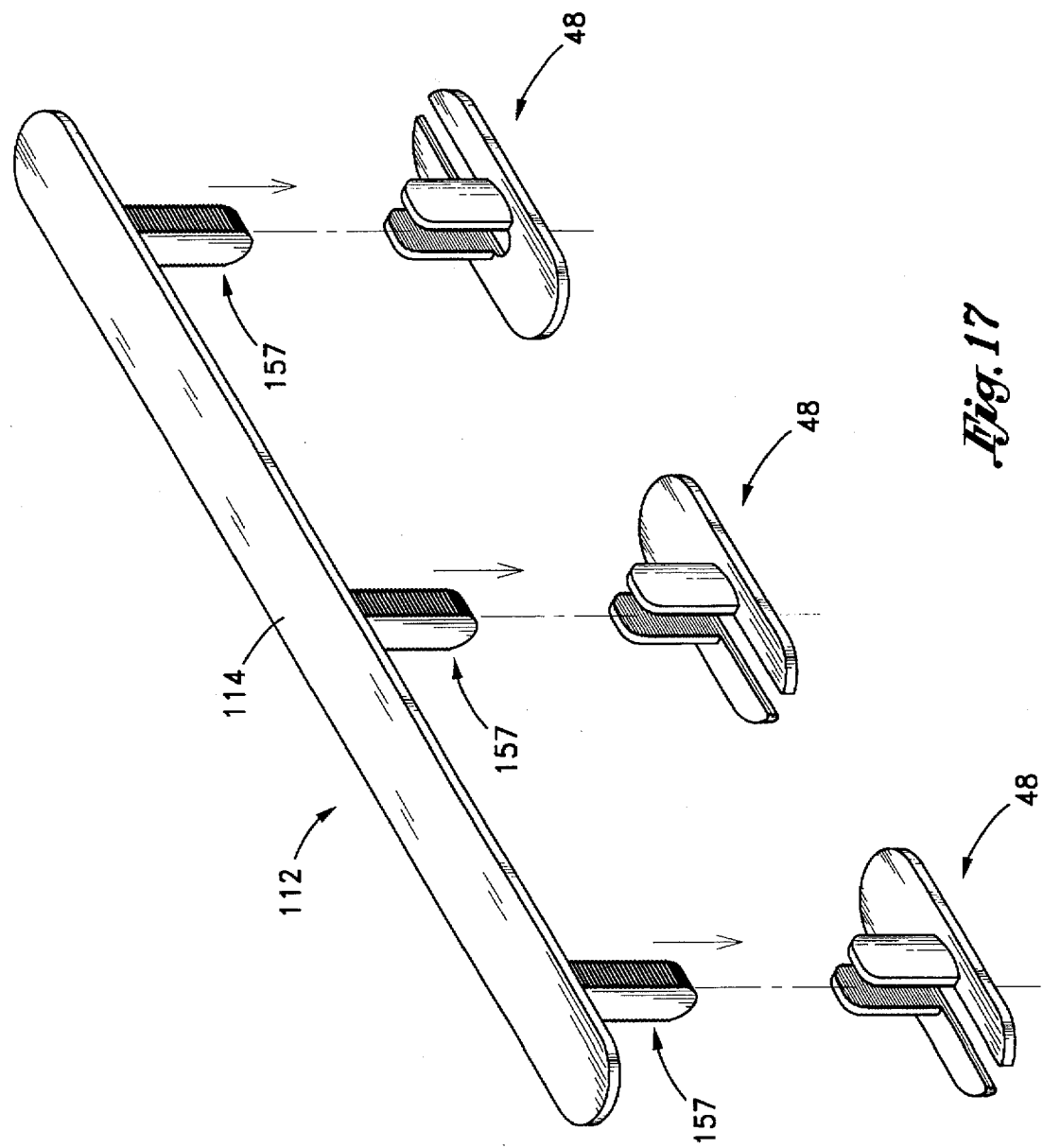

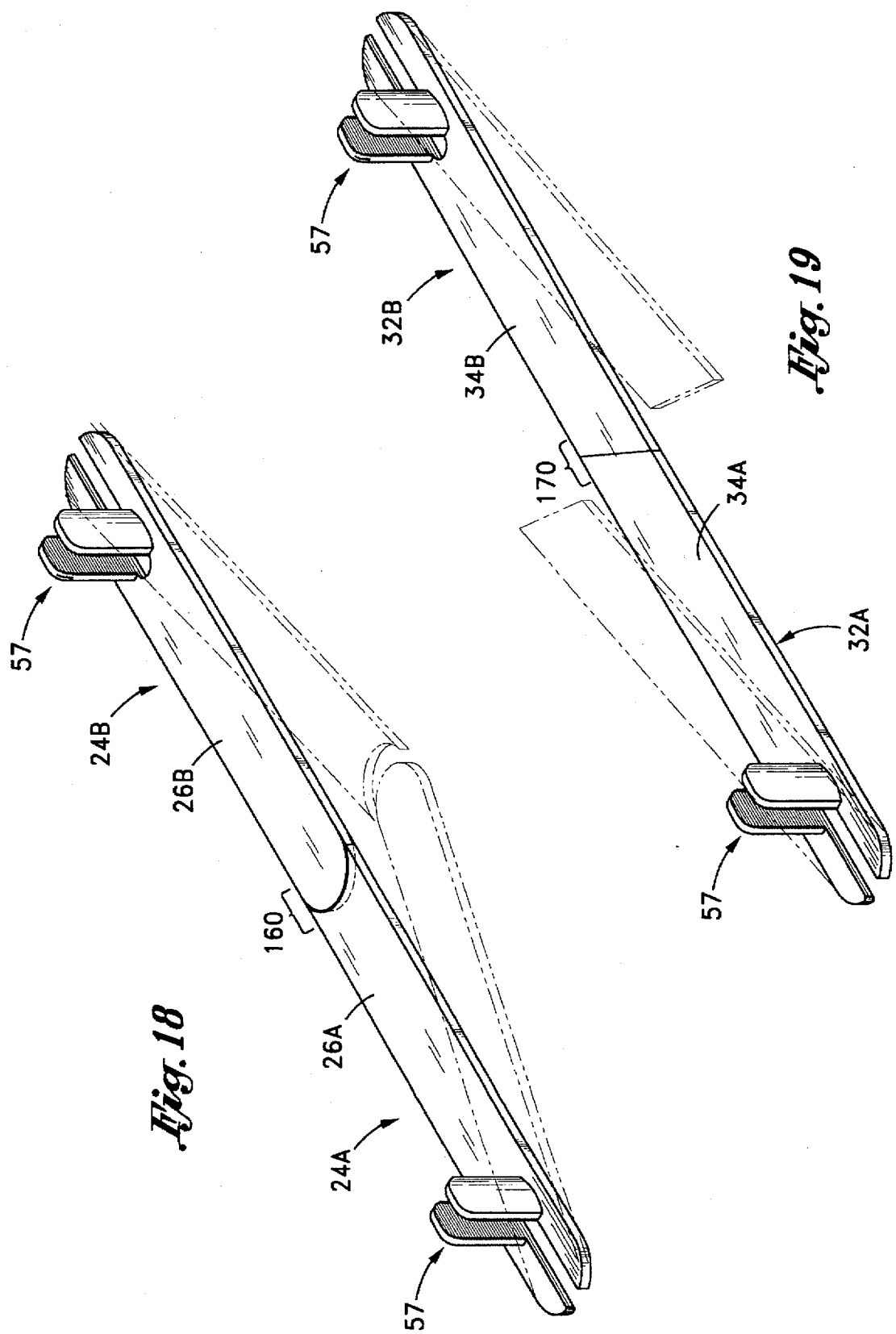

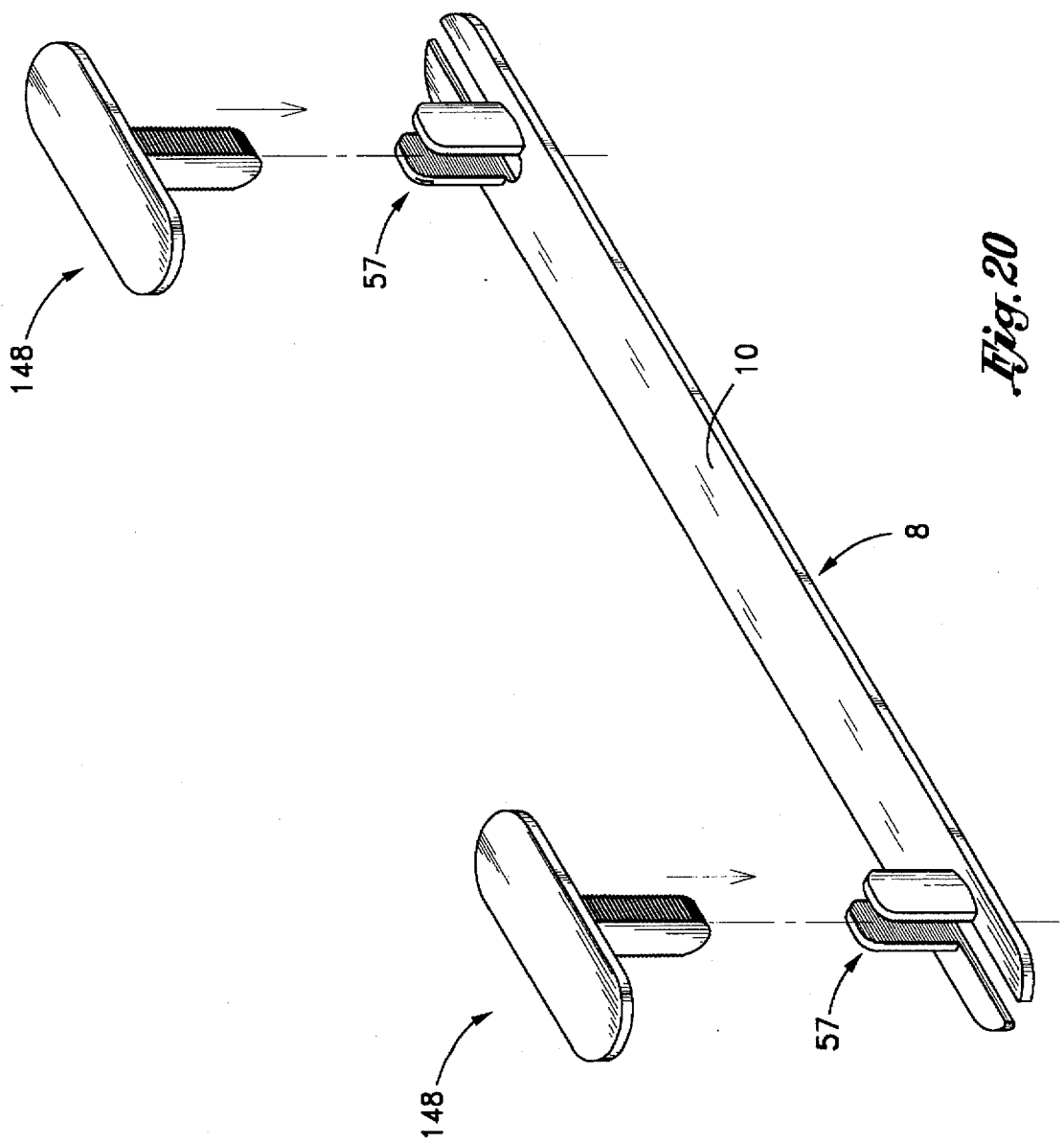

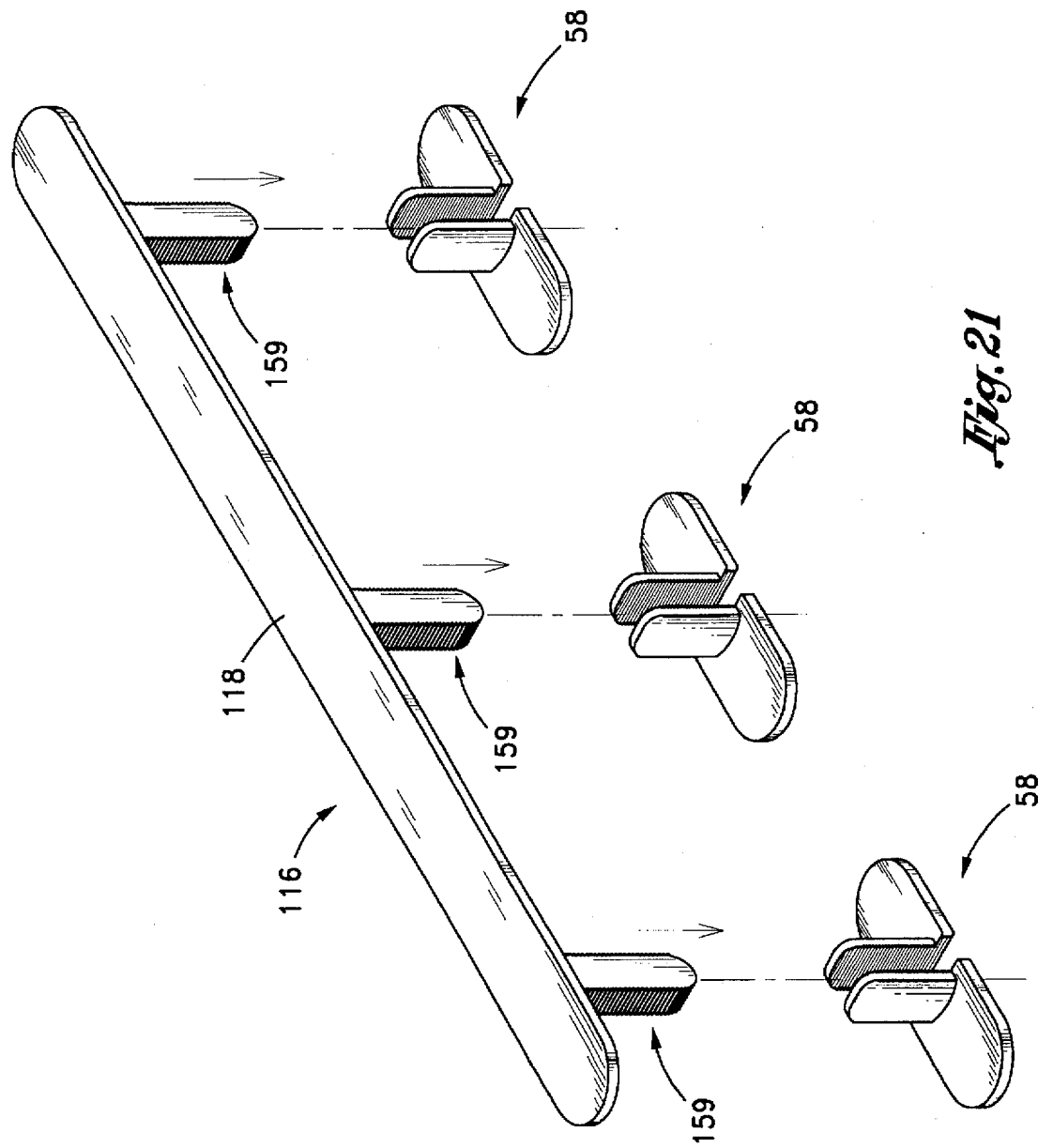

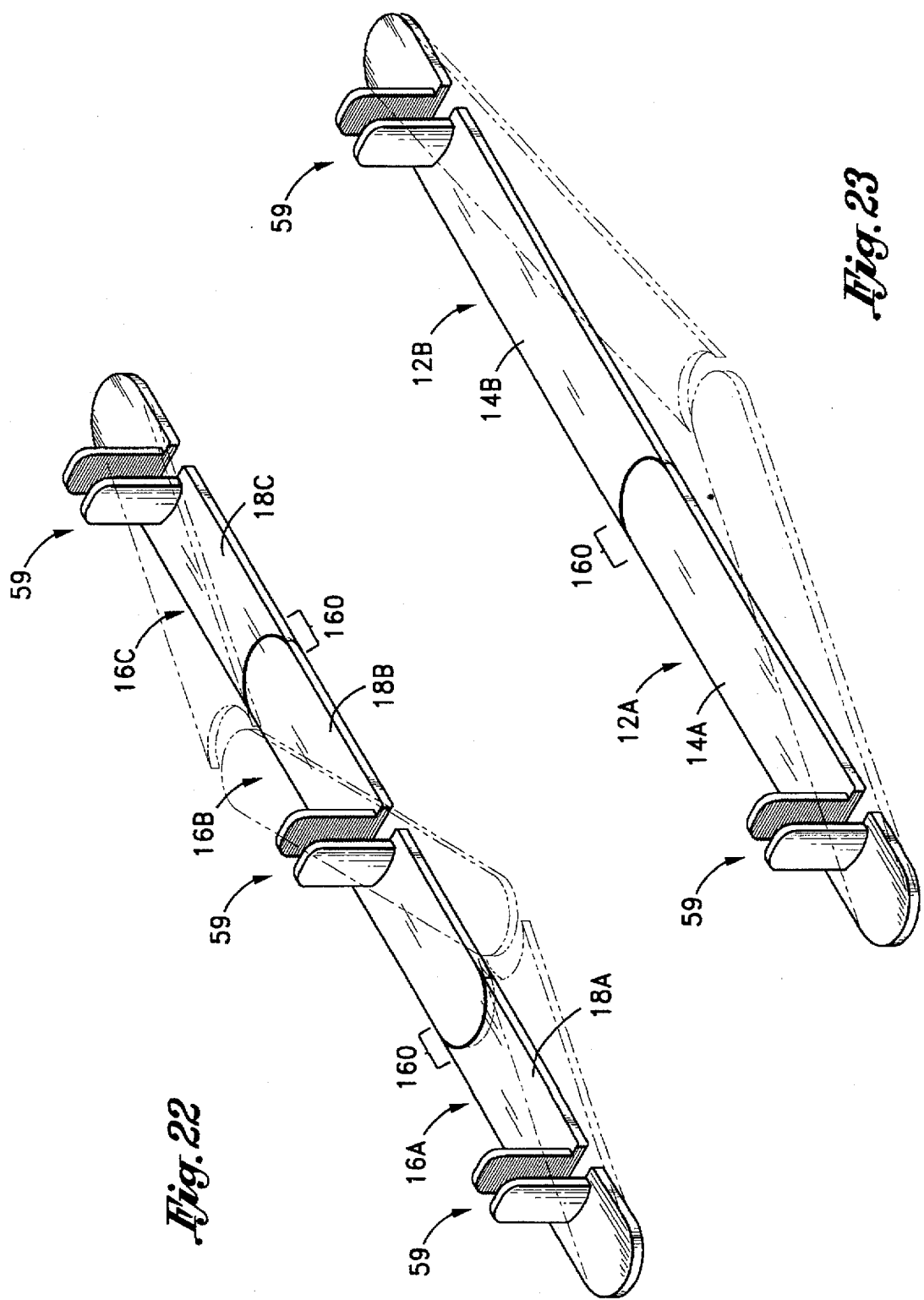

ADJUSTABLE, RELEASABLE BINDING FASTENER

This case is a continuation-in-part of U.S. patent application Ser. No. 08/461,061 filed on Jun. 5, 1995 now abandoned.

BACKGROUND OF THE INVENTION

1. Field of the Invention

This invention relates generally to paper fasteners and more particularly to an adjustable two-part fastener that easily binds and locks a stack of paper or the like through a binding hole in the stack, and can further unbind the stack with a simple turn locking means.

2. Description of Related Art

Many types of paper fasteners are known to the public. The paper clip is easily attached and removed, but is limited to holding only a few sheets of paper and is not secure. The common ACCO strip-type fastener can hold a larger quantity of paper than the paper clip and hold it with greater security. It has thus become a popular fastening device for term papers, business reports, legal documents, and the like. The base portion of the Acco fastener is a metal strip with an elongated, flexible prong at each end. In use, the prongs are inserted through spaced apart binding holes in a stack of paper. A locking bar with corresponding holes for the prongs is then slid over and down the length of the prongs until it rests against the paper. Each prong is then bent flat against the upper surface of the locking bar, and sliding retainers secure the prongs in place. To access the secured paper this process is reversed. Assembly and disassembly with this fastener is time consuming and cumbersome. Furthermore, the thin metal prong easily cuts the fingers, requiring inordinate caution when handling. Also, this fastener cannot be used with a lone binding hole, and is useless unless the stack of paper has two binding holes spaced exactly to match it.

A fastener that is more secure than the paper clip, quicker to attach and remove than the Acco fastener, and requires only a single binding hole, if desired, is the common brass fastener. The brass fastener has a flattened, rounded head and two prongs. In use, the prongs are inserted through a binding hole in a stack of paper and then bent away from each other and pressed against the back side of the stack. Unfortunately, the prongs do not typically stay flat against the paper but instead, tend to stick out from it. Often this causes them to scratch the skin and desk tops, and to get caught on clothing. This is a particular complaint in the television and motion picture industries where, despite its limitations, the brass fasteners have become the standard for fastening scripts. Script pages are changed frequently, and the brass fasteners must be removed and reinserted with each change. But when the prongs are pulled out of the script they tend to stay bent apart, which makes it a nuisance to get them back through the binding holes, especially with thicker scripts. The prongs also tend to mutilate the back page, sometimes causing it to fall off. Additionally, stacking and shelving of scripts bound with brass fasteners is a problem because the prongs also tend to catch on the heads of other fasteners and the scripts themselves.

Despite these problems, brass and strip fasteners remain extremely popular. This is largely due to the fact that although many other prior art fasteners have overcome the cutting, chafing, and inserting disadvantages of brass and strip fasteners, none of them allow for convenient access to the stack for changing or adding pages. For example, U.S. Pat. No. 3,970,331 to Giulie discloses a device with a dual strip configuration. A first backing strip has a series of ratchet teethed posts on it, and is used in conjunction with a second strip with a series of holes in it, each hole having a mating ratchet tooth for engagement with the teeth on the posts. A blocking means is provided to hold the ratchet teeth permanently in engagement with each other. After the binding element has been applied, any excess length of the post can be cut off.

But again, the significant problem with this type of fastener is that once the ratchet teeth have engaged with each other and the excess length of post has been eliminated, there is no way to add or remove paper. As such, this system permanently binds paper stacks and is not useful with manuscripts, reports, and other documents where frequent changes in the paper contents are required.

Likewise, U.S. Pat. No. 3,647,306 to Chamberlin details a post construction for loose-leaf binders in which the post is comprised of two inter-engaging complementary parts, one for each cover. The two post parts are expanded by interior means to force them into tight engagement with the wall of a binding hole through the paper block, which operates to lock the binder. With its two parts assembled, the post is generally tubular, and each part is made up of one or more sector shaped pieces of the tubular wall. The binding post parts can be formed integrally with their respective covers or they can be independent elements separate from the covers. However, this invention also incurs several problems, the biggest being that there is no convenient way to detach the fastener from the stack of paper for alterations of the stack's contents. In addition, the post must operate in conjunction with a block of paper for the binding to lock, no provision having been made in the post construction for holding its inter-fitting parts in engagement with one another in the absence of a sizable block of paper.

Likewise, U.S. Pat. No. 5,074,696 to Tanaka sets forth a fastener arrangement that uses a semi-cylindrical shank formed with engagement ribs in confronting relationship relative to securing pairs of the fasteners. While this device employs a unique locking system, it, too, provides no convenient way to unlock the device and also requires base plates to hold the shank in place.

U.S. Pat. No. 4,730,972 to Rickson Sun et al. discloses a two-part binding system that includes one or more bifurcated posts integrally extending from a clamping strip or member. The posts are inserted into one or more apertures in a stack of punched paper or other material. A second clamping strip having one or more integral or separate latching buttons inserted over and around the posts. Each button includes one or a pair of toothed pawls integrally hinged to a cross bar extending across a button aperture. The posts contain a series of transverse ratchets facing each other. As the second strip and its integral or snap-in latching button is manually pressed over the posts toward the first clamping strip, the teeth of the pawl teeth ratchet successively into the posts toward the base of the posts until the stack of paper is firmly grasped and the teeth mesh with a final transverse ratchet. At this position, the strips are bowed putting the edges of the stacked sheets in compression. A spine is also disclosed which has a series of parallel spaces score lines, and is bent around the edges of both clamping strips and firmly adhered to the strips.

Unlike the previous, similar fasteners, the Rickson Sun invention can be forced apart to allow paper substitutions of the stack. However, in order to force the fastener apart, a special tool must be used. This does not make for convenient, frequent alterations of the enclosed pages.

Likewise, binding means disclosed in Groswith U.S. Pat. No. 4,893,836 and Groswith U.S. Pat. No. 5,080,398 require some sort of disassembly tool in order to modify the paper contents, and are therefore not capable of meeting the demands of frequently altered documents, such as a manuscript-in-progress. Even when the debinding tool is used, a significant number of pages cannot be added to the stack because the excess post lengths are cut off, tailoring the fastener to the original size of the stack.

In addition; all of these binding fasteners employ a strip type configuration with a fixed number of posts in fixed positions, which limits their use to documents with matching configurations of binding holes. Furthermore, some of these fasteners block the left margin of the bound stack.

Therefore, there is a clear need for a device that can overcome the scratching, mutilating, storing, and reinserting problems of brass fasteners; the finger cutting and time consumption problems of the Acco fasteners; and the inability to disassemble the more permanent fasteners, while still being able to quickly fasten a stack of paper in a manner that allows for frequent removing, changing and/or adding of pages. The instant invention fulfills these needs and provides other related advantages as described in the summary below.

SUMMARY OF THE INVENTION

The present invention is a two-part, adjustable and releasable fastener that easily binds and locks a stack of paper in a way that is at once secure and yet easily disassembled for alterations and additions to the stack's contents.

The fastener consists of a male and female portion that interlock with each other. Each portion has a similarly shaped base that is larger than standard binding holes. The male portion has a post extending downwardly from its base while the female portion has a collar extending upwardly from its base. To secure a stack of paper with a binding hole, the collar of the female portion is first inserted from the bottom of the stack upwardly through the binding hole until the base of the female portion contacts the stack's bottom surface. The male post is then inserted from the top of the stack downwardly through the binding hole and into the female collar. The post and collar are locked together by one-way ratchet teeth on both the outer surface of the post and the inner surface of the collar. The stack is thus held firm between the two bases.

The post can be manufactured in various lengths. The longer its length, the larger the stack of paper the fastener can accommodate. The post has an approximately circular shape with a dome shaped tip. Two series of one-way ratchet teeth extend down the length of the post on opposing sides. Two small protruding lobes likewise run the length of the post on opposing sides, each lobe being positioned lengthwise in the space between the two series of teeth.

The collar can also be manufactured to varying lengths. The shorter it is, the smaller the stack of paper the fastener can firmly secure. The collar is composed of two halves, each half corresponding to the curvature of the series of teeth on the post. For example, if each series of teeth on the outer surface of the male post has 150 degrees of curvature with 30 degree lobes in between them, then each half of the collar will also have 150 degrees of curvature, with 30 degree spaces between the two collar halves. The female base includes an aperture centered directly beneath the circular space defined by the collar halves, the aperture having the same diameter as the collar halves. The inner surface of each collar half has a series of one-way ratchet teeth that are angled in the opposite direction of those on the post, each series of collar teeth continuing beyond the termination of the collar half and into the aperture in the base.

In the process of binding the stack the male post is moved downwardly into the female collar, the male portion being oriented so that the lobes on the exterior of the post move smoothly into the spaces between the collar halves. Simultaneously, the ratchet teeth on the post engage one by one with the ratchet teeth on the inner surfaces of the collar halves. When the male base contacts the top page the stack is bound. If the stack of paper being fastened is relatively short, the post can even move downwardly through the aperture in the female base, the ratchet teeth on the post engaging with the continuation of ratchet teeth in the aperture. The slope of the ratchet teeth on the post is the reverse of the slope of the ratchet teeth inside the collar. This allows the post to move downwardly into the collar, but not back upwardly and out, thus firmly locking the two portions together with the stack secured between the bases.

To unbind the stack in order to change, remove, or add pages the male and female portions are easily disengaged from one another simply by turning one of their bases approximately 90 degrees from the other. As the turn is made, the lobes on the post are moved into contact with the collar halves, forcing them slightly apart so that the two interlocked series of ratchet teeth are disengaged and the post can be pulled out of the collar.

Thus, it is an object of the invention to provide a unique new way to secure a stack of paper together. It is a further object of the invention to accommodate frequent page alterations of the stack by providing a simple locking and unlocking mechanism that takes a minimal amount of time to use.

It is another object of the invention to significantly improve upon the prior art by providing a design that includes no sharp or protruding pieces, thus eliminating the possibility of scratching skin or catching clothing with the fastener. In addition, the present invention provides a flatter surface for stacking and storing manuscripts, and can be used time and time again without incurring signs of wear or bending. Further, the new invention in no way alters or destroys the top or bottom pages of paper, as is frequently the case with prior fasteners.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The invention, its configuration, construction, and operation will be best further described in the following detailed description, taken in conjunction with the accompanying drawings in which:

FIG. 1 is an exploded perspective view of the first embodiment of the present invention, particularly showing a two part fastener oriented for fastening;

FIG. 2 is an exploded perspective view of the first embodiment of the present invention, particularly showing the two part fastener oriented for unfastening;

FIG. 3 is a top plan view of the female portion of the invention shown in FIG. 1, particularly showing the preferred 130 degree angle of inclusion of each of the upwardly extending collar halves of the female portion;

FIG. 3A is an alternate plan view of FIG. 3, particularly showing a 90 degree angle of inclusion of each of the upwardly extending collar halves of the female portion;

FIG. 3B is another top plan view of FIG. 3, particularly showing an alternate oval design of the upwardly extending collar halves of the female portion;

FIG. 4 is a bottom plan view of the male portion of the invention in the orientations in which it is shown in FIG. 1, particularly showing the preferred 130 degrees of ratchet teeth on the post;

FIG. 4A is an alternate bottom plan view of FIG. 4, particularly showing 90 degrees of ratchet teeth on the post;

FIG. 4B is another bottom plan view of FIG. 4, particularly showing an alternate oval design of the post containing the ratchet teeth;

FIG. 5 is a cross-sectional view of the present invention taken along line 5—5 of FIG. 6, particularly showing the positioning of male and female portions through a binding hole in a stack of paper;

FIG. 5A is an exploded view of FIG. 5 identified by line 5A, showing in greater detail the configuration of the series of ratchet teeth on both the male and female portions;

FIG. 6 is a perspective view of the invention of FIG. 1, illustrating the invention as installed in a stack of paper for binding same;

FIG. 7 is a modified version of the invention of FIG. 1, illustrating in exploded perspective three female collars constructed in a singular strip, in conjunction with three separate male portions;

FIG. 10 is a modified version of the invention of FIG. 1, illustrating in exploded perspective three female collars constructed in a singular strip, in conjunction with two separate male portions having extended strip-like bases that abut each other without interlocking, with phantom lines indicating their position for unfastening; FIG. 11 is an exploded perspective view of a locking means for extended strip-like bases of fasteners shown in FIGS. 8, 9, 18, 22 and 23;

FIG. 12 is an exploded perspective of a second embodiment of the present invention showing a two-part fastener oriented for fastening;

FIG. 13 is a perspective view of the fastener shown in FIG. 12, illustrating its position in a stack of paper, oriented for unfastening;

FIG. 14 is a schematic side view of the fastener shown in FIG. 12, illustrating its position when turned 90 degrees in the stack so as to be in position for unfastening, with phantom lines showing the movement necessary for disengagement;

FIG. 17 illustrates a series of three male portions joined by a common strip and opposing a set of three individual female portions having slots extending along the midline of their bases as was shown in FIG. 15;

FIG. 18 illustrates two female portions aligned in a strip, having mating convex and concave curved ends adapted for swinging open and shut about the axis of their female collar halves which were shown in FIGS. 15 and 17;

FIG. 19 illustrates female portions aligned in a strip, having mating angled ends, and which are identical, for swinging open and shut about the axis of their collar halves which were shown in FIGS. 15 and 17;

FIG. 20 illustrates a strip-like base having a female collar at each end, the collars having a design similar to the individual female portions of FIGS. 15 and 17; and which engage individual male members as shown in FIG. 15;

FIG. 21 is a perspective view of a series of three male posts extending from a common strip-like base, the posts being engageable with a series of individual female members as were shown in FIG. 16;

FIG. 22 is a perspective view of a series of three female portions with interlocking bases having collar arrangements similar to that shown for FIG. 16 and illustrating rotational unlocking about the axis of the collars;

FIG. 23 is a perspective view of two female portions with interlocking bases having two female collars, one near the end of each base, and illustrating rotational unlocking about the axis of the end collars.

DETAILED DESCRIPTION OF THE PREFERRED EMBODIMENT

Figure 8:
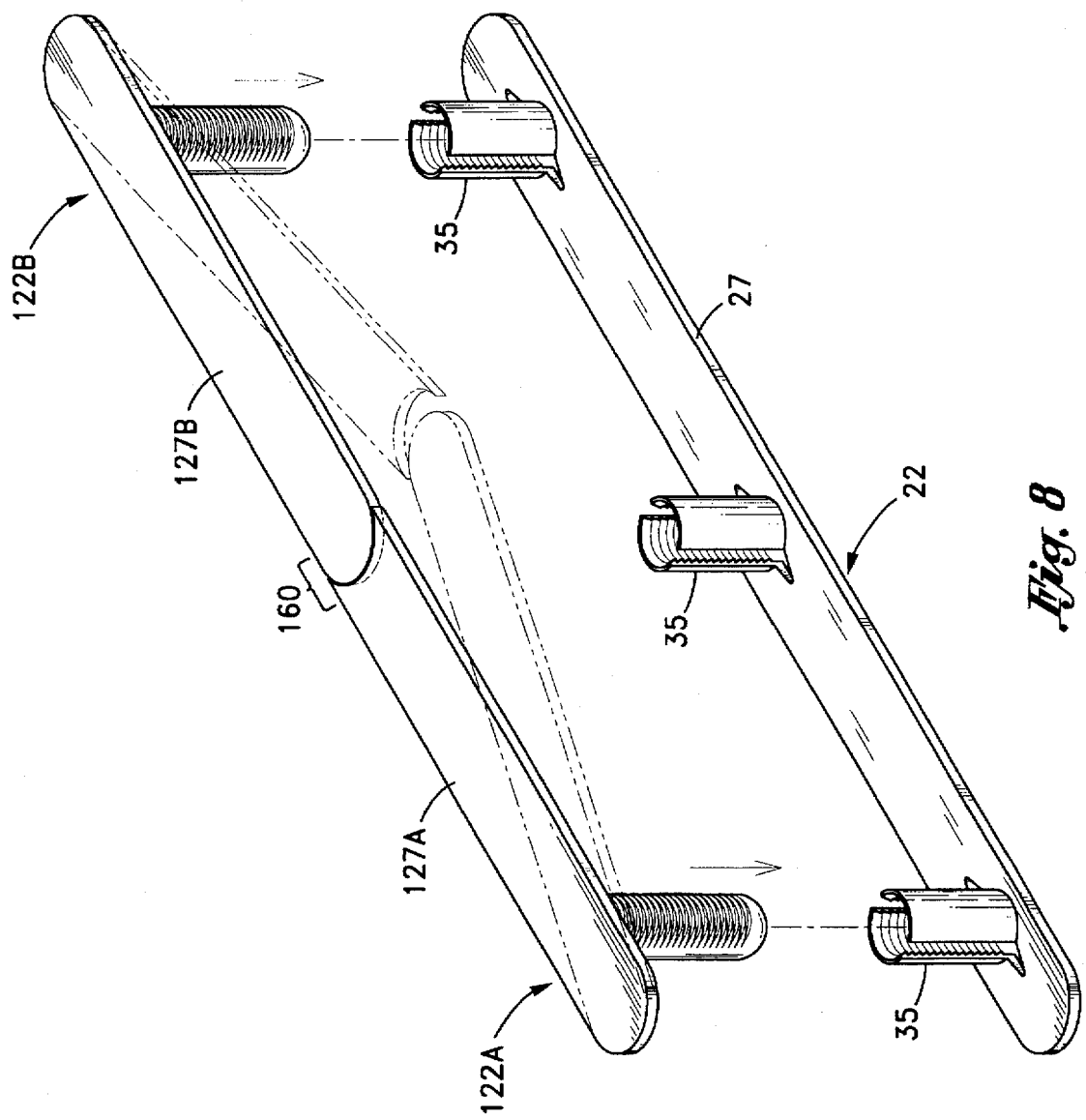
FIG. 8 is a modified version of the invention of FIG. 1, illustrating in exploded perspective three female collars constructed in a singular strip, in conjunction with two separate male portions having extended strip-like bases that interlock, with phantom lines indicating their position for unfastening.

FIGS. 1 and 2 show a two-part adjustable, releasable fastener for binding a stack of paper through a binding hole 6 in the stack (FIG. 6). The fastener has a female portion 20 and a male portion 120, that lock together as they are pushed into engagement through the binding hole 6. The portions 20 and 120 are easily releasable from the locked position, allowing pages to be easily and quickly added or removed from the stack, the fastener automatically adjusting to accommodate changes in the stack size.

As clearly seen in FIGS. 1 and 2, both the female and male portions 20 and 120 have a horizontally oriented base, 25 and 125 respectively. Preferably, the bases 25 and 125 have an elongated oval shape, are relatively thin, and have a smooth top surface so as to facilitate easy stacking and storing of bound stacks. However, the shape and size of the two bases 25 and 125 can vary, as long as both bases 25 and 125 are larger than standard binding holes 6, and their inner base surfaces 25A and 125A, which contact the stack of paper, are generally flat.

The female base 25 has an aperture 30, as best seen in FIG. 3. Positioned around the aperture 30 is a circular collar 35, composed of two curved collar halves 35A, which extend upwardly from the inner base surface 25A. As seen in FIGS. 1, 2, and 6, the collar 35 is designed to be inserted into the binding hole 6 from the bottom of the stack, until the inner base surface 25A rests in parallel alignment against the bottom sheet of the stack.

Preferably, each collar half 35A has an angular range of approximately 150 degrees, leaving spaces 45 between the two halves 35A that are approximately 30 degrees each (FIG. 3). However, as illustrated in FIG. 3A, each collar half 35A could be constructed with approximately 90 degrees of curvature, thus leaving spaces 45 of approximately 90 degrees between them. The inner, concave surface 37 of each collar half 35A has a vertical, first series of horizontal ratchet teeth 40 (see FIGS. 1 and 2) that covers the full curvature and extends down the full length of the inner surface 37 of each collar half 35A and through the aperture 30.

As seen in FIG. 3, a pair of opposing slots 36 extends from the aperture 30 into the base 25. The position and size of the slots 36 corresponds with that of the spaces 45 between the collar halves 35A. The slots 36 give the collar halves 35A improved resilience and flexibility to withstand inadvertent pressure and force, and allow for the pushing apart of the collar halves 35A during disengagement.

As seen in FIGS. 1 and 2, a rod-like post 135 extends downwardly from the inner base surface 125A of the male portion 120 shown as the underside of the base 125. Preferably, the post 135 has a dome-shaped tip so as to facilitate smooth entry into the female collar 35. The exterior surface of the post 135 has two vertical second series of horizontal ratchet teeth 140 positioned on opposing sides of the post 135. The angular range of each of the second series of teeth 140 is equal to the curvature of the collar halves 35A so that the first and second series of ratchet teeth 40 and 140 are of a matching size. Thus, if the collar halves 35A each have 150 degrees of curvature (FIG. 3), then the second series of teeth 140 on the post 135 also each should have 150 degrees of curvature (FIG. 4). Likewise, if the collar halves 35A each have 90 degrees of curvature (FIG. 3A), then each of the second series of ratchet teeth 140 should also have 90 degrees of curvature (FIG. 4A). Preferably, as illustrated in FIG. 4, a smooth-surfaced lobe 145 extends between each of the second series of teeth 140, the lobes 145 corresponding in size to spaces 45 between the collar halves 35A.

To properly interlock the portions 20 and 120 together through a stack of paper, the bases 25 and 125 are mutually aligned along an edge of a stack of paper, as illustrated in FIG. 6. Preferably, the collar 35 of the female portion 20 is first inserted into the binding hole 6 from the bottom of the stack until the inner base surface 25A of the female portion 20 contacts the bottom sheet of the stack. The post 135 of the male portion 120 is then inserted downwardly through the binding hole 6 from the top of the stack and into contact with the collar 35 of the female portion 20. In this position, the second series of ratchet teeth 140 on the post 135 are aligned with the first series of ratchet teeth 40 in the collar halves 35A, and each of the lobes 145 on the post 135 are aligned with each of the spaces 45 between the collar halves 35A. As the male portion 120 is moved downwardly into the female portion 20, the second series of ratchet teeth 140 on the post 135 engages with the first series of ratchet teeth 40 in the collar halves 35A in a tooth-by-tooth fashion until the inner base surface 125A of the male portion 120 is in snug contact with the top surface of the paper stack, and the inner base surface 25A of the female portion is in snug contact with the bottom surface of the paper stack (FIG. 5).

When the stack of paper is relatively large, only a small portion of the first and second series of ratchet teeth 40 and 140 may engage with one another before the inner base surfaces 25A and 125A are in snug contact with the paper stack. On the other hand, when the stack of paper is relatively small, the post 135 may move all the way through the collar 35 and continue through the aperture 30 in the female base 25 before the inner base surface 125A contacts the paper stack. In this situation, the second series of teeth 140 engages not only the first series of teeth 40 contained in the collar halves 35A, but also the continuation of the first series of teeth 40 contained in the aperture 30 of the female base 25. If desired, the portion of the post 135 that extends through the aperture 30 may be clipped off.

The vertical length of both the post 135 and the collar 35 can be of any magnitude. The longer the post 135 and/or the collar 35, the larger the stack of papers the fastener can bind; and the shorter the collar 35 and post 135, the smaller the stack of papers the fastener can secure. In addition, as seen in FIGS. 1 and 2, the collar 35 can be constructed with a length considerably shorter than the post, since only a few individual teeth 41 and 141 in each series of ratchet teeth 40 and 140 need to engage with one another in order for the fastener to be securely locked.

Preferably, the engagement and interlocking of the first and second series of ratchet teeth 40 and 140 is accomplished because each individual tooth 41 (FIG. 5A) in the first series of ratchet teeth 40 located on the inner surface 37 of the collar halves 35A has a downwardly sloping upper female tooth surface 42, and a horizontal lower female tooth surface 44. Likewise, each individual tooth 141 in the second series of ratchet teeth 140 located on the post 135 has a horizontal upper male tooth surface 144 and an upwardly sloping lower male tooth surface 142. Thus, as seen in FIG. 5A, the downwardly sloping surfaces 42 and 142 of the mutually engaging female and male teeth 41 and 141 are positioned and sized to move slidingly past each other under manual force, while the horizontal surfaces 44 and 144 are positioned and sized to intimately engage and prevent the fastener portions from moving apart. This engagement locks the portions securely together and prevents them from becoming inadvertently disengaged from one another.

When it is desired to remove the fastener from the stack, it is extremely easy and efficient to disengage the two portions 20 and 120. As demonstrated in FIG. 2, the opposing bases 25 and 125 are merely rotated into mutual right angular relationship, allowing the male portion 120 to be extracted from the female portion 20. This is possible because when the bases 25 and 125 are rotated, the convex lobes 145 on the exterior surface of the post 135 move from their positions in the spaces 45 between the collar halves 35A into contact with the first series of teeth 40 on the inner surfaces 37 of the collar halves 35A. The slots 36 in the base 25 provide resilience in the base 25 that allows the collar halves 35A to flex apart so that the second series of teeth 140 on the post 135 are disengaged from the first series of teeth 40 in the collar halves 35A, unlocking the female and male portions 20 and 120 and allowing them to be removed from the binding hole 6.

However, when the collar halves 35A and the second series of ratchet teeth 140 each have approximately 90 degrees of curvature, the posts 135 can be manufactured without protruding lobes 145 in favor of rounded untoothed surfaces 137, as illustrated in FIG. 4A. In this embodiment lobes are not necessary because the collar halves 35A do not have to be moved apart in order for the first and second series of teeth 40 and 140 to be disengaged, as a 90 degree turn is all that is needed to completely disengage the corresponding sections of the series of teeth 40 and 140.

It is also possible to manufacture the post without protruding lobes 145 even when the second series of ratchet teeth 140 on the post 135 and the first series of ratchet teeth 40 in the collar halves 35A are both greater than 90 degrees of curvature. This is possible if the post 135 and the collar 35 are manufactured slightly oval instead of perfectly round, with the two second series of ratchet teeth 140 positioned on the two long sides of the oval-shaped post 135 (FIG. 4B), and the two collar halves 35A are correspondingly positioned (FIG. 3B). In this shape the untoothed surfaces 137 of the post 135 between the two second series of teeth 140 are, in effect, a protrusion which forces the collar halves 35A to flex apart when the bases 25 and 125 are rotated perpendicular to each other.

Even if the post 135 and the collar 35 are manufactured perfectly round, and both series of ratchet teeth 140 and 40 are greater than 90 degrees of curvature, it is possible to eliminate the protruding-shaped lobes 145. This is because the untoothed surfaces 137 positioned between the two second series of teeth 140 on the post 135 act as a protrusion in effect when they are rotated into the first series of ratchet teeth 40 on the inner surfaces 37 of the collar halves 35A because the untoothed surfaces 137 do not allow entry of the ratchet teeth 40 from the collar halves 35A. Thus, the collar halves 35A are forced apart.

The construction of the fastener can also be slightly varied so that the inner base surface 25A of the female portion 20 (See FIG. 5) is held fast to the stack by gripping teeth (not shown), or adhesive (not shown), or other appropriate means, or manufactured as part of the back cover so that just rotating the male base 125 without having to hold the female base 25, disengages the interlocked portions 20 and 120. In another variation, the outer surface of the collar 35 can be manufactured with a gripping means (not shown) so that the collar 35 is firmly lodged into position in the binding hole 6 and remains in its position when the male portion 120 is rotated, so that the two portions 20 and 120 disengage.

The above described embodiment and variations of the invention are designed to secure a stack of paper with individual fasteners in each binding hole 6 of the stack, depending on the number of binding holes 6 the user chooses to fill. Since many stacks of paper have a standard binding hole configuration, such as a three-hole punch configuration, the fasteners can also be manufactured with a multiple collar female portion 22, as illustrated in FIG. 7. In this variation, three spaced apart female collars 35 are manufactured in a single, strip-like or strip shaped base 27. Three separate, corresponding male portions 120 are provided, each interlocking with a collar 35 and each being individually rotated to disengage from the corresponding collar 35. As shown in FIG. 7, the multiple collar female portion 22 is designed to engage with a standard three-hole punch binding hole configuration. However, the multiple collar female portion 22 could also be created with different numbers of collars 35 and/or different spacing so as to engage with any other standard binding hole configurations. These embodiments have several advantages. They are aesthetically pleasing; they add strength to the manuscript; they add speed to the stack assembly process; and they eliminate the need to hold the female base in place while turning the male base to unlock the fastener.

A further variation of the multiple collar design is shown in FIG. 8. In this configuration the male portions 122A and 122B have extended bases 127A and 127B respectively that are manufactured in longer separate strips, which interlock longitudinally with each other by means of a convex and concave locking shape 160. In the convex and concave locking shape 160, the ends are curved complements of each other.

Alternatively, the locking shape could be an overlapping C-shaped locking shape 161 as shown in FIG. 11. In the C-shaped locking shape 161, the upper tongue 155 on the end of one male strip base 127A or 127B overlaps the lower tongue 55 on the end of the adjacent male strip base 127A or 127B, thus preventing the ends of the male bases 127A or 127B from separating from each other and unattractively popping up from the top page of the stack. Each tongue 155 and 55 has a convex rounded end 153 and 53 respectively that fits into the concave C-shaped indented end 151 and 51 respectively of the adjacent male strip base 127A or 127B, thus holding the male strip bases 127A and 127B in a straight line while still allowing them to rotate for unlocking, as shown by phantom lines in FIG. 8.

Figure 9:
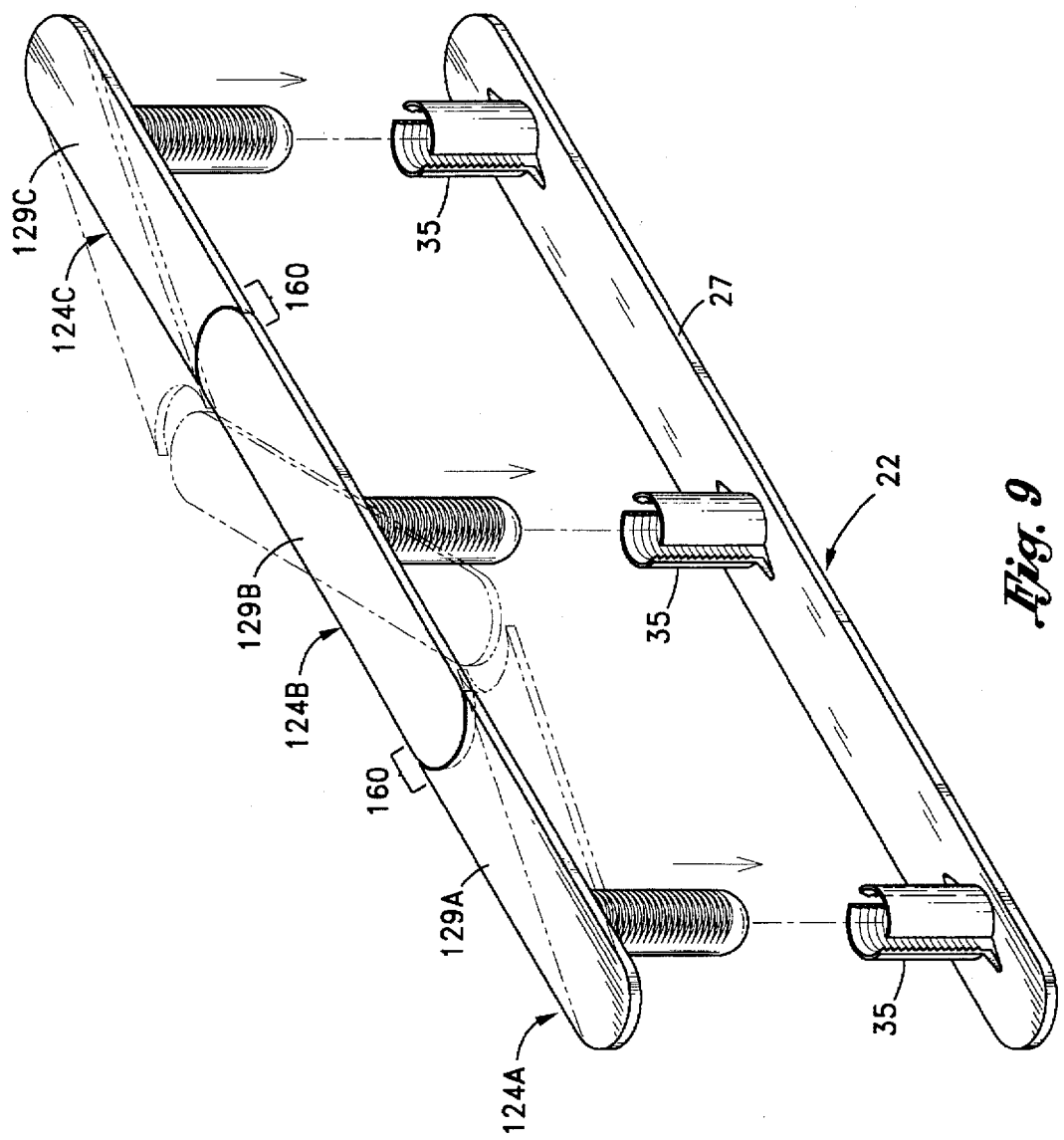
FIG. 9 is a modified version of the invention of FIG. 1, illustrating in exploded perspective three female collars constructed in a singular strip, in conjunction with three separate male portions having extended strip-like bases that interlock, with phantom lines indicating their position for unfastening.

When the concave and convex locking shape 160 is used in a configuration that has three male strip-base portions 124A, 124B, and 124C, as shown in FIG. 9, the male base 129B in the center would preferably have a design with an upper tongue 155 at each end as shown. During disengagement with this configuration, no matter which male portion 124A, 124B, or 124C is turned, the others will be forced to turn also, as shown.

A simpler variation shown in FIG. 10 has the male strip bases 131A and 131B simply abutting each other and not interlocking. In this version the ends of the male strip bases 131A and 131B at the abutment 170 are angled as shown to allow for disengagement rotation of each male portion 126A and 126B. If just two male strip-base portions 122A and 122B, or 126A and 126B are used to interlock with a multiple collar female portion 22 in a three-hole punch configuration, the center hole of the stack can be filled with a real or dummy collar to further strengthen and stabilize the stack.

Even though the variations in FIGS. 7, 8, 9, and 10 show multiple female collars 35 connected into a single strip-like base 27, the fasteners could equally be designed so that multiple male posts 135 are bound into a single strip-like base (not shown) with separate corresponding female portions 20 provided.

In another embodiment shown in FIG. 12, the male portion 128 has a post 14B that is generally flat sided instead of rounded. The post 145 has two sides 139, each side 139 having a vertical series of horizontal ratchet teeth 150, similar to those in the first embodiment and running the full length and width of each side 139. The female portion 28 has a collar 47 composed of two collar halves 47A. Each collar half 47A contains a vertical series of horizontal ratchet teeth 50, similar to those in the first embodiment, on the generally flat inner surface 39 of each half. The outer surface 49 of each collar half is rounded for easy entry into the binding hole 6. The female base 65 has a slot-like opening 60 in the space between the two collar halves 47A, which allows the post 14B to pass through the base 65 when binding a relatively short stack. The series of ratchet teeth 50 on the inside of each collar half 47A continues uninterrupted down through the opening 60. As shown, the opening 60 is slightly longer than the space between the collar halves 47A. This gives flexibility to the base 6B, thereby allowing the collar halves 47A to flex apart during engagement.

The engagement of the portions in this embodiment is the same as the engagement in the first embodiment and variations, but the disengagement is achieved by rotating both portions 28 and 128 in unison 90 degrees (FIG. 13), which positions a part of both bases 165 and 65 beyond the edge of the stack. These outside parts of the bases 165 and 65 are then pressed together which breaks the horizontal alignment and meshing of both series of ratchet teeth 150 and 50 on the post 145 and in the collar 47 respectively, and frees the portions 128 and 28 for withdrawal as seen in FIG. 14. The extended length of the opening 60 allows the post 145, after being pushed into the opening 60 to bind a short stack, enough room to move during disengagement. The sides 139 and the inner surfaces 39 can be manufactured with a slight complementary curvature (not shown) and still be able to disengage in this manner. If desired, similar openings (not shown) can be manufactured in the male base 165 on each side of the post 145 in order to allow the collar halves 47A to pass through the male base 165 as well.

Figure 15:
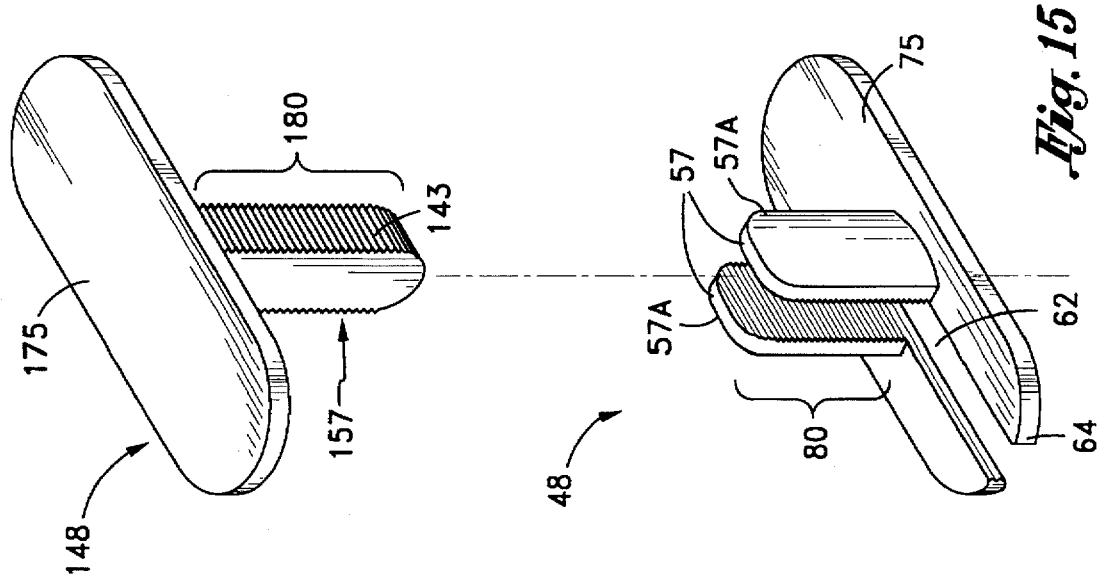
FIG. 15 is a perspective view of a variation on the fastener shown in FIGS. 12–14 where the male post has a somewhat more square shape and the female portion has an open slot at one end of the female base.

A variation of the flat post and collar fastener is shown in FIG. 15. The male portion 148 has a base 175 and a less flat, and more square shaped post 157 than was shown with respect to FIGS. 12–14, with a vertical series of horizontal ratchet teeth 180 similar to those in the other embodiments on the flat surfaces 143 of the post 157 that are parallel to the base 175 as shown.

The female portion 48 supports a collar 57 composed of two flat collar halves 57A oriented longitudinally on the base 75 of the female portion 48 as shown. Each collar half 57A also contains a vertical series of horizontal ratchet teeth 80. The female base 75 has a slot-like opening 62 in the space between the two collar halves 57A, which allows the post 157 when engaged to pass through the female base 75 when binding a relatively short stack of paper.

The series of ratchet teeth 80 on the inside of each collar half 57A continues uninterrupted down through the slot-like opening 62. Additionally, the slot-like opening 62 allows the collar halves 57 a greater ability to flex apart. The slot-like opening 62 extends longitudinally on the base 75 and is open at an end 64 of thee base 75.

The engagement of the portions 148 and 48 in the structures shown in FIG. 15 is the same as the engagement in the embodiments of FIGS. 12–14. Disengagement is achieved by one of two methods. The first method is the same as that used to disengage fastener portions 128 and 28 and shown in FIGS. 13 and 14. That is, the male portion 148 and the female portion 48 are rotated in unison 90 degrees, which positions a part of both their bases 175 and 75 beyond the edge of the stack. These outside parts of the bases 175 and 75 are then pressed together which breaks the horizontal alignment and meshing of both series of ratchet teeth 180 and 80 on the post 157 and in the collar 57 respectively, and frees the portions 148 and 48 for withdrawal from each other. In the second method disengagement is achieved by rotating either the male portion 148 or the female portion 48 90 degrees with respect to the other. Upon such rotation, the less flat, more squared dimensions of the post 157 allow it to turn within the flexing collar halves 57A until the ratchet teeth 180 on the post 157 disengage from the ratchet teeth 80 on the collar halves 57A, thus allowing the male portion 148 to be withdrawn from the female portion 48.

Figure 16:
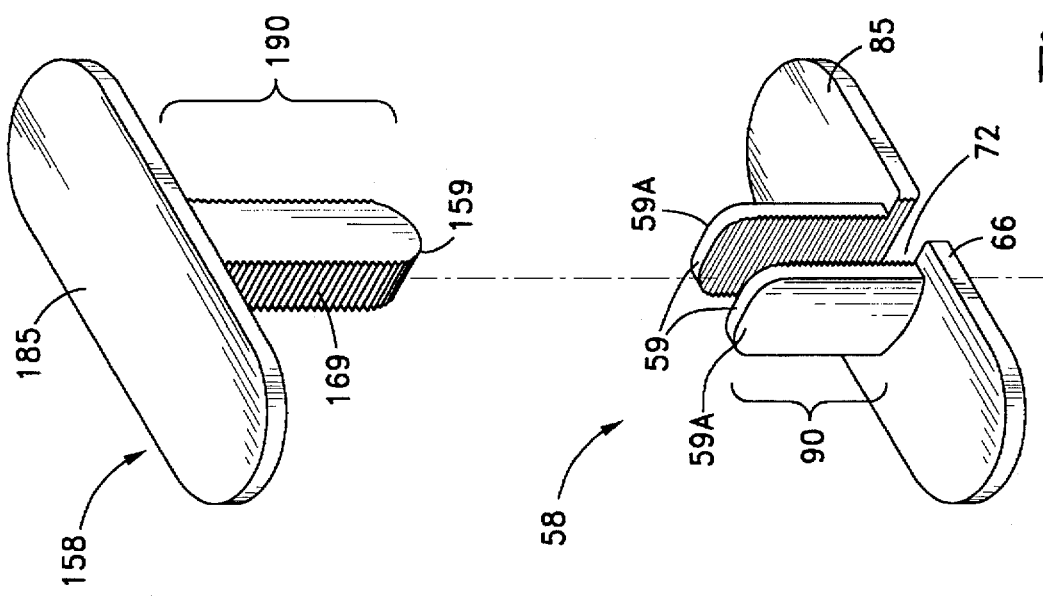
FIG. 16 is a perspective view of a variation on the fastener shown in FIGS. 12–15 where the male post is oriented 90° about the axis of its shaft, with respect to the male post shown in FIG. 15, and where the female collar is similarly shifted with respect to the orientation of the collar shown in FIG. 15.

Another variation of the flat post and collar fastener is shown in FIG. 16. The male portion 158 has a base 185 and a post 159 that is also less flat and more square shaped, with a vertical series of horizontal ratchet teeth 190 similar to those in the embodiments of FIG. 15, but rotated 90 degrees along the axis of the post 159. The horizontal ratchet teeth 190 are carried on both flat surfaces 169 of the post 159 that face the long ends of the base 185, and are thus oppositely disposed.

The female portion 58 supports a collar 59 composed of two flat collar halves 59A oriented perpendicularly on the base 85 of the female portion 58 as shown. On the inside of each collar half 59A is a vertical series of horizontal ratchet teeth 90 similar to those in the other embodiments. The vertical series of horizontal ratchet teeth 90 are oppositely disposed and face each other. The female base 85 has a slot-like opening 72 in the space between the two collar halves 59A, which allows the post 159 when engaged to pass through the female base 85 when binding a relatively short stack of paper.

The series of ratchet teeth 90 on the inside of each collar half 59A continues uninterrupted down through the opening 72. To allow the collar halves 59A to flex apart, the opening 72 extends laterally on the base 85 and is open at one side 66 of the base 85.

The engagement of the portions 158 and 58 in this embodiment is the same as the engagement in the embodiment of FIG. 15. Disengagement is achieved by rotating one portion 90 degrees from the other. Upon rotation, the dimensions of the post 159 allow it to turn within the flexing collar halves 59A until the ratchet teeth 190 on the post 159 disengage from the ratchet teeth 90 on the collar halves 59A, allowing the male portion 158 to withdraw from the female portion 58.

Referring to FIG. 17, a perspective view of a plurality of male posts 157 extending from a multiple-post portion 112 with a long strip-like base 114 is shown. Below, a series of separate corresponding female portions 48 are provided, each independently interlockable with a post 157 and each being individually rotatable to disengage from the corresponding post 157. The posts 157 can be spaced apart to match the standard three-hole binding configuration, or a different number of posts 157 may be used to match any standard binding configuration.

Referring to FIG. 18, a female embodiment with a configuration similar to that of the male embodiment shown in FIG. 8 is shown in which female portions 24A and 24B have extended bases 26A and 26B, each of which support a collar 57. When the bases 26A and 26B are aligned longitudinally they are urged to remain aligned by the interlocking of the concave end of base 26A and the convex end of base 26B. Alternatively, the overlapping C-shaped locking shape 161 shown in FIG. 11 can be used to maintain alignment. The embodiment in FIG. 18 is conveniently matched with the multiple-post male portion 112 shown in FIG. 17. Phantom lines show how the female portions 24A and 24B rotate to disengage from their corresponding posts 157 of the male portion 112 of FIG. 17. In this combination the middle post 157 of the male portion 112 (FIG. 17) can be used to stabilize the paper stack or simply be eliminated.

Referring to FIG. 19, a further embodiment of interfitting female portions with extended bases is shown. This embodiment is similar in configuration to the male embodiment of FIG. 10, the bases in both having angled ends. To match this configuration, the male portion 112 shown in FIG. 17 is preferably used. Here, each of two female portions 32A and 32B has a collar 57 located on its base 34A or 34B, the bases 34A and 34B each being extended in the direction of the other and interfacing with each other at an angled abutment 170. The ends of the bases 34A and 34B are angled at the abutment 170 as shown in order to allow for disengagement rotation of portions 32A and 32B as illustrated by phantom lines. Again, if the male portion 112 (FIG. 17) is used in combination, the middle post 157 of the male portion 112 can be used to stabilize the paper stack or simply be eliminated.

Referring to FIG. 20, a long strip-like female portion 8 has an extended base 10, and a collar 57 at each end. Each collar 57 has its slot-like opening facing outwardly. Separate male portions 148 are provided which rotate to disengage from the female collars 57.

Referring to FIG. 21, a multiple-post male portion 116 is shown, consisting of a long strip-like base 118 supporting a plurality of male posts 159. A series of separate corresponding female portions 58 are provided, each having a collar 59 that interlocks with a post 159, and each being individually rotated to disengage from the corresponding post 159. The posts 159 can be spaced apart to match the standard three-hole binding configuration, or a different number of posts 159 can be used to match any standard binding hole configuration.

Referring to FIG. 22, a series of three separate female portions has extended interfitting bases that correspond with the multiple-post male portion 116 shown in FIG. 21. In FIG. 22 each of three collars 59 extends from portions 16A, 16B and 16C, having associated extended bases 18A, 18B, and 18C that engage each other in a convex and concave locking Shape 160 as shown. Alternatively, the ends could be shaped like the overlapping C-shaped interface locking shape 161 as shown in FIG. 11. When the C-shaped interface locking shape 161 is used in a configuration that has three portions with strip-like bases, the base in the center would preferably have each of its ends convex and overlapping relative to the other two interfacing bases. Each collar 59 of portions 16A, 16B, and 16C interlocks with a post 159 and each is individually rotated by turning its supporting portion 16A, 16B, or 16C to disengage from the corresponding post 159. The rotation for disengagement is illustrated by phantom lines.

Referring to FIG. 23, a female configuration similar to the male configuration of FIG. 8, illustrates a paired structure engageable with the multiple-post male portion 116 shown in FIG. 21. Here in FIG. 23, each of two collars 59 are supported by portions 12A and 12B, having extended bases 14A and 14B that engage each other in a concave and convex interface locking manner as shown. Each collar 59 of portions 12A and 12B interlocks with a post 159 of the male portion 116 (FIG. 21) and each is individually rotated by turning its corresponding portion 12A or 12B to disengage from its corresponding post 159 as illustrated by phantom lines.

Figure 24:
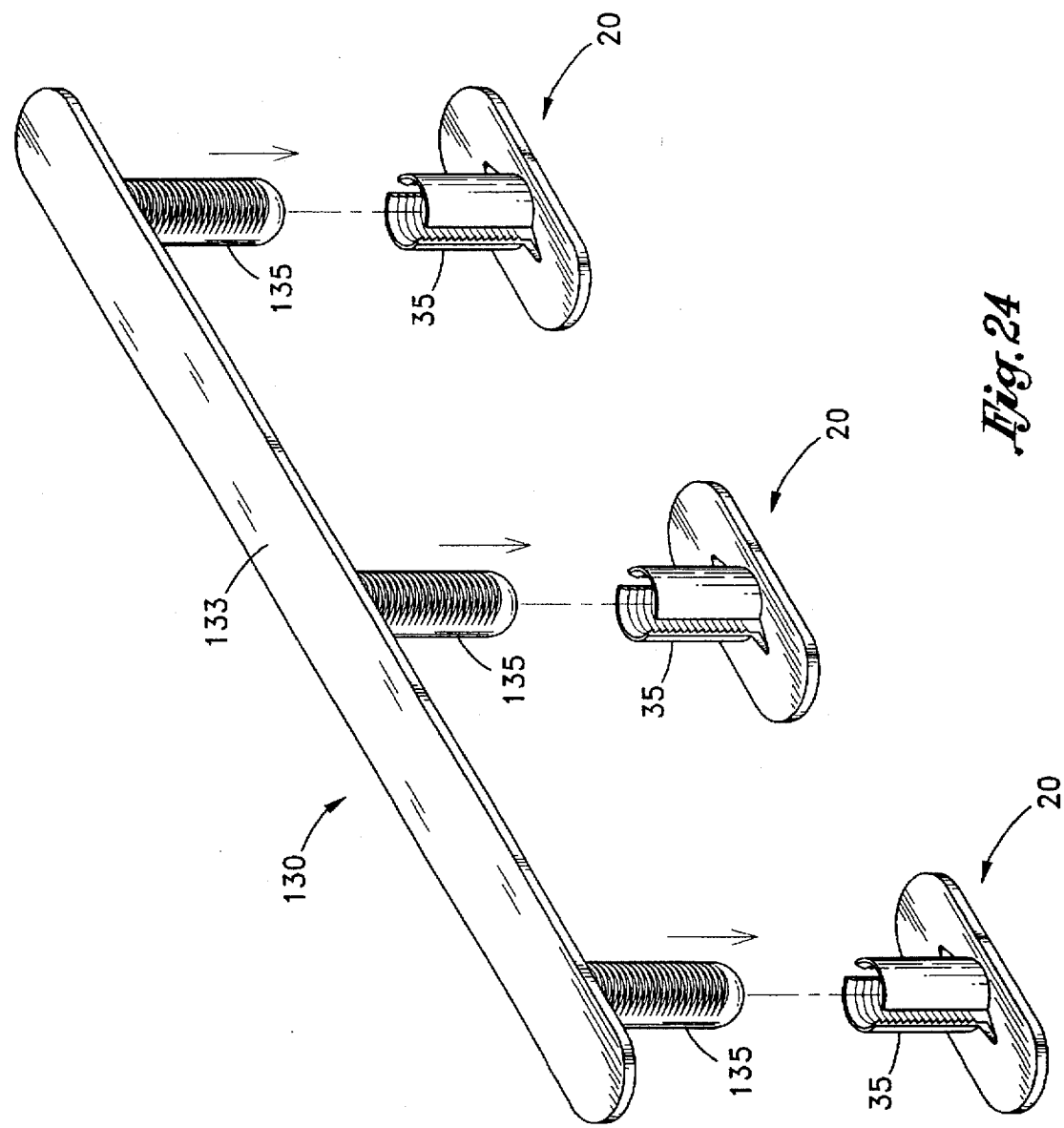
FIG. 24 is a perspective view of a series of three male posts supported by a common strip, the posts being engageable with a series of individual female portions.

FIG. 24 shows a fastener with a male portion 130 having a strip-like base 133 containing a plurality of round male posts 135. Separate corresponding female portions 20 containing female collars 35 are preferably provided for engagement with the male portion 130. Other variations of separate female portions with extended bases similar to those of the male bases 127A, 127B, 129A, 129B, 129C, 131A and 131B in FIGS. 8, 9, and 10 may also be used with this configuration.

Although many combinations of male and female fastener portions and male and female post and collar combinations have been described, this is not to say that other possible combinations are excluded. It is also clear that many of the combinations that were described as to the round posted fasteners could also be used with flat-posted fasteners and vice versa, and it is only in the interest of not being excessive that the full range of combinations are not set forth specifically. Additionally, male and female bases can each be significantly extended in design and still not interface with adjacent bases.

Preferably, all embodiments and variations of the fasteners are made of a material taken from the group of structural materials including plastics, rubbers, and metals, and preferably all embodiments and variations are made by a fabrication process taken from the group of structural processes including molding, injection molding, casting, forming, machining, and stereo lithographic layer buildup.

While the invention has been described with reference to preferred embodiments relating to a fastener, it is to be clearly understood by those skilled in the art that the invention is not limited thereto, and many changes and modifications of the invention may become apparent to those skilled in the art without departing from the spirit and scope of the invention. Therefore, included within the patent warranted hereon are all such changes and modifications as may reasonably and properly be included within the scope of this contribution to the art, and the scope of the invention is to be interpreted only in conjunction with the appended claims.

What is claimed:

1. A releasable fastener for binding a stack of paper, comprising:

a female fastener portion having a first planar base including an aperture therethrough, and further having an arcuate shaped collar extending perpendicularly from said first planar base, said collar comprised of a pair of opposing, parallel collar halves positioned on opposing sides of the aperture, each of the collar halves including a vertical, first series of ratchet teeth facing the aperture; and a male fastener portion having a second planar base, and a rod-like post extending perpendicularly from said second planar base, said post having an exterior surface having two vertical oppositely disposed second series of ratchet teeth oriented to engage said first series of ratchet teeth when said post is inserted between said arcuate shaped collar and towards said aperture, in a ratchet manner when the first and the second series of ratchet teeth are mutually engaged.

2. The fastener recited in claim 1 wherein said rod-like post having a pair of oppositely disposed, eccentric, convex lobes separated by said second series of horizontal teeth.

3. The fastener recited in claim 1 wherein said first planar base is elongate and wherein said second planar base is elongate and wherein said second series of ratchet teeth are oriented to engage said first series of ratchet teeth when said first elongate planar base is in parallel alignment with said second elongate planar base.

4. The fastener of claim 1 wherein the female portion further includes a pair of opposing slots in the first planar base, the slots positioned between the collar halves and lying on opposite sides of said aperture for providing resilience in the first planar base to facilitate the collar halves to move apart for withdrawal of the male portion from the female portion.

5. The fastener of claim 1 wherein each of the teeth in the collar halves comprises a sloping female tooth surface, and a lower female tooth surface planar parallel to said first planar base, and wherein each of the teeth in the post comprises a planar upper male tooth surface planar parallel to said second planar base and a sloping lower male tooth surface, said sloping surfaces of the mutually engaging male and female teeth positioned and sized to move slidingly past each other under manual force, and the tooth planar surfaces being positioned and sized for intimate engagement and preventing the fastener portions from moving apart.

6. The fastener system of claim 1 wherein the collar halves of the female portion each extend circularly along said aperture over an angular range of from approximately 90° to about 150° per collar half.

7. The fastener system of claim 1 wherein the ratchet teeth in the post of the male portion extend in two opposing sides of said post, each series of teeth having a radial angular extent of from about 90° to about 150°.

8. The fastener system of claim 1 wherein the collar halves of the female portion have a circular arcuate shape.

9. The fastener system of claim 1 wherein the collar halves of the female portion have an oval arcuate shape.

10. The fastener system of claim 1 wherein the post of the male portion has a circular cylindrical shape.

11. The fastener system of claim 1 wherein the post of the male portion has an oval cylindrical shape.

12. A releasable fastener for binding a stack of paper, comprising:

a first planar base;

a plurality of female collars supported by said first planar base, said planar base including an aperture therethrough associated with each female collar, each collar comprised of a pair of arcuate shaped collar halves, parallel to each other and extending perpendicularly from said first planar base, the collar halves positioned on opposing sides of each aperture, each of the collar halves including a vertical, first series of ratchet teeth facing the aperture; and a plurality of male fastener portions, each having a second planar base, and a rod-like post extending perpendicularly from said second planar base, each said post having an exterior surface having two vertical oppositely disposed second series of ratchet teeth oriented to engage said first series of ratchet teeth when said post is inserted between said arcuate shaped collar of said female fastener portion and towards said aperture, in a ratchet manner when the first and the second series of ratchet teeth are mutually engaged.

13. The fastener recited in claim 12 and including a first male fastener portion having a first length of said second planar base and a second male fastener portion having a second length of said second planar base, and wherein said first length of said second planar base aligns with and contacts said second length of said second planar base when the second series of ratchet teeth of said first and said second male fasteners are mutually engaged with the first set of ratchet teeth of their corresponding female fastener portions, and wherein said first and second lengths of said second planar base can be pivoted out of alignment and contact with each other to disengage said second series of ratchet teeth of said first and said second male fasteners from the first set of ratchet teeth of their corresponding female fastener portions.

14. The fastener recited in claim 13 wherein each one of said first and second male fastener portions define an area of partial complementary overlap adjacent their area of contact.

15. The fastener recited in claim 14 wherein the area of overlap is rounded.

16. The fastener recited in claim 13 wherein each one of said first and second male fastener portions defines an area of curved contact.

17. The fastener recited in claim 13 and further including a third male fastener portion having a third length of said second planar base, and wherein said third length of said second planar base aligns with and contacts both said first and second lengths of said second planar base when the second series of ratchet teeth of said first, second and third male fasteners are mutually engaged with the first set of ratchet teeth in the corresponding collars of the female fastener portion, and wherein said first, second and third lengths of said second planar base can be pivoted out of alignment and contact with each other to disengage said second series of ratchet teeth of said first, second and third male fasteners from the first set of ratchet teeth in the corresponding collars of the female fastener portion.

18. The fastener recited in claim 17 wherein said first planar base is elongate and wherein said first, second and third lengths of said second planar base are elongate and wherein said second series of ratchet teeth are oriented to engage said first series of ratchet teeth when said first elongate planar base is in parallel alignment with said first, second and third lengths of said second planar base.

19. The fastener of claim 12 wherein the first planar base further includes a plurality of apertures, each aperture associated with a single one of said female collars, the slots positioned between the collar halves and lying on opposite sides of said aperture for providing resilience in the first planar base to facilitate the collar halves to move apart for withdrawal of the male portion from the female portion.

20. A releasable fastener for binding a stack of paper, comprising:

a female fastener portion having a first planar base including a slot of extended length therethrough, and a collar including a pair of sides extending perpendicularly from said first planar base, said pair of sides in opposing relationship and separated by said slot, each of the sides including a vertical, first series of parallel ratchet teeth sloping toward the slot;

a male fastener portion having a second planar base, and a post extending perpendicularly from said second planar base, said post having a pair of oppositely disposed exterior surfaces each having a vertical second series of parallel ratchet teeth oriented to engage said first series of parallel ratchet teeth when said post is inserted between said pair of sides of said collar in a ratchet manner when the first and the second series of ratchet teeth are parallel and are mutually engaged.

21. The fastener of claim 20 wherein the male post is generally square shaped.

22. The fastener of claim 20 wherein the slot in the first planar base extends in one direction longitudinally along said planar base and opens at the end of said planar base.

23. The fastener of claim 20 wherein said collar halves are oriented perpendicularly to a main longitudinal extent of the first planar base.

24. The fastener of claim 20 wherein the slot in the first planar base extends laterally along said planar base and opens at a side of said planar base.

25. A releasable fastener for binding a stack of paper, comprising:

a male portion having a first planar base and a plurality of male posts perpendicularly supported by said first planar base, each post having an exterior surface having two vertical, oppositely disposed first series of ratchet teeth; and a plurality of female fastener portions, each having a second planar base including an aperture therethrough, and having a female collar perpindicular to said planar base, each female collar including a pair of collar halves, the collar halves positioned on opposing sides of said aperture, each of the collar halves including a vertical, second series ratchet teeth facing the series of ratchet teeth on the other collar half and on opposite sides of said aperture, and oriented to engage said first series of ratchet teeth of one of said male posts when one of said male posts and said collar are engaged.

* * * * *